US007532215B2

(12) United States Patent
Yoda et al.

(10) Patent No.: US 7,532,215 B2
(45) Date of Patent: May 12, 2009

(54) IMAGE GENERATING APPARATUS, IMAGE GENERATING METHOD AND IMAGE GENERATING PROGRAM

(75) Inventors: Akira Yoda, Kanagawa (JP); Yukita Gotohda, Kanagawa (JP); Shuji Ono, Kanagawa (JP); Kazuhiro Mino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 825 days.

(21) Appl. No.: 10/932,308

(22) Filed: Sep. 2, 2004

(65) Prior Publication Data

US 2005/0046626 A1     Mar. 3, 2005

(30) Foreign Application Priority Data

Sep. 2, 2003     (JP)     ............... 2003-310430
Aug. 13, 2004     (JP)     ............... 2004-236129

(51) Int. Cl.
G06T 17/00     (2006.01)
G06T 1/00     (2006.01)
G06T 15/00     (2006.01)
G06T 15/10     (2006.01)
G06T 15/20     (2006.01)
G06F 17/00     (2006.01)

(52) U.S. Cl. ..................... 345/427; 345/424
(58) Field of Classification Search .................. 345/424
See application file for complete search history.

(56) References Cited

U.S. PATENT DOCUMENTS 4,595,990 A * 6/1986 Garwin et al. ............. 708/141

| | | | | |
|---|---|---|---|---|
| 5,436,638 A * | 7/1995 | Bolas et al. | ............. | 345/156 |
| 5,729,471 A * | 3/1998 | Jain et al. | ............. | 725/131 |
| 5,850,352 A * | 12/1998 | Moezzi et al. | ............. | 345/419 |
| 6,009,210 A * | 12/1999 | Kang | ............. | 382/276 |
| 6,346,956 B2 * | 2/2002 | Matsuda | ............. | 715/848 |
| 6,380,933 B1 * | 4/2002 | Sharir et al. | ............. | 345/419 |
| 6,573,912 B1 * | 6/2003 | Suzuki et al. | ............. | 715/757 |
| 6,580,821 B1 * | 6/2003 | Roy | ............. | 382/154 |
| 6,707,933 B1 * | 3/2004 | Mariani et al. | ............. | 382/118 |
| 6,741,250 B1 * | 5/2004 | Furlan et al. | ............. | 345/427 |
| 6,990,681 B2 * | 1/2006 | Wang et al. | ............. | 725/105 |

(Continued)

FOREIGN PATENT DOCUMENTS

JP     07-162744 A     6/1995

(Continued)

*Primary Examiner*—Wesner Sajous
*Assistant Examiner*—Crystal Murdoch
(74) *Attorney, Agent, or Firm*—Sughrue Mion, PLLC

(57) ABSTRACT

An image generating apparatus for generating a visual field image seen from a photographed person who is photographed in at least one part of plural two-dimensional images, based on the plural two-dimensional images captured by plural image capturing apparatuses, comprises a photographed person's position detector for detecting a position of the photographed person, based on at least two of the plural two-dimensional images; a photographed person's direction detector for detecting a face direction of the photographed person; a three-dimensional information generating section for generating three-dimensional information of space that is photographed, based on at least two of the two-dimensional images; and an image generating section for generating the visual field image seen from the position of the photographed person along the face direction, based on the three-dimensional information, the position of the photographed person, and the face direction of the photographed person.

16 Claims, 13 Drawing Sheets

U.S. PATENT DOCUMENTS

| | | | |
|---|---|---|---|
| 7,103,211 B1* | 9/2006 | Medioni et al. | 382/154 |
| 7,106,361 B2* | 9/2006 | Kanade et al. | 348/159 |
| 7,127,081 B1* | 10/2006 | Erdem | 382/103 |
| 7,221,809 B2* | 5/2007 | Geng | 382/280 |
| 7,340,100 B2* | 3/2008 | Higaki et al. | 382/199 |
| 2001/0020946 A1* | 9/2001 | Kawakami et al. | 345/582 |
| 2001/0033675 A1* | 10/2001 | Maurer et al. | 382/103 |
| 2001/0056477 A1* | 12/2001 | McTernan et al. | 709/219 |
| 2002/0057280 A1* | 5/2002 | Anabuki et al. | 345/633 |
| 2002/0061131 A1* | 5/2002 | Sawhney et al. | 382/154 |
| 2002/0145660 A1* | 10/2002 | Kanade et al. | 348/36 |
| 2003/0123713 A1* | 7/2003 | Geng | 382/118 |
| 2003/0210329 A1* | 11/2003 | Aagaard et al. | 348/159 |
| 2004/0136574 A1* | 7/2004 | Kozakaya et al. | 382/118 |
| 2004/0247174 A1* | 12/2004 | Lyons et al. | 382/154 |
| 2006/0152434 A1* | 7/2006 | Sauer et al. | 345/8 |

FOREIGN PATENT DOCUMENTS

| | | |
|---|---|---|
| JP | 08-084351 A | 3/1996 |
| JP | 09-016772 A | 1/1997 |
| JP | 09-251550 A | 9/1997 |
| JP | 11-045351 A | 2/1999 |
| JP | 2001-028765 A | 1/2001 |

* cited by examiner

IMAGE GENERATING APPARATUS, IMAGE GENERATING METHOD AND IMAGE GENERATING PROGRAM

This patent application claims priorities on Japanese Patent Applications, 2003-310430 filed on Sep. 2, 2003, and 2004-236129 filed on Aug. 13, 2004, the contents of which are incorporated herein by reference.

BACKGROUND OF THE INVENTION

1. Field of the Invention

The present invention relates to an image generating apparatus, an image generating method and an image generating program. More particularly, the present invention relates to an image generating apparatus, an image generating method and an image generating program for generating a visual field image seen from a photographed person who is photographed in at least one part of the plural two-dimensional images, based on plural two-dimensional images captured by plural image capturing apparatuses, or generating an image including a photographed person in at least one part of the plural two-dimensional images, based on plural two-dimensional images which are captured by plural image capturing apparatuses.

2. Description of the Related Art

Many kind of methods for generating a visual field image seen from a viewpoint along a visual direction, based on captured images are well known. The Japanese Patent Laid-Open No. 9-251550 discloses such a technology that an image quality of a neighboring part of a visual field is set to be lower than that of a central part of the visual field so that the amount of data is compressed, when generating an image seen from a viewpoint along a visual direction, which are detected by a visual direction input apparatus mounted on a viewer's head, based on images in which a subject have been photographed from plural viewpoints by moving a camera.

The Japanese Patent Laid-Open No. 9-16772 discloses a technology for generating an image seen along a predetermined visual direction by calculating a distance to a subject and a moving direction and moving distance of the image input means, and image-processing the image that is input, based on the image input to the image input means.

The Japanese Patent Laid-Open No. 8-84351 discloses a technology for generating an image seen from random viewpoints and random visual directions, based on a moving direction, a moving distance, a visual direction and information with respect to the order of playback, corresponding to an image captured by a camera to which a moving distance detector is added.

The Japanese Patent Laid-Open No. 7-162744 discloses a technology for converting an image, in which a moving object in three-dimensional space is photographed, into an image that is captured by a virtual camera located at random positions, using a plane defined as an intermediary within the visual field of the camera.

The Japanese Patent Laid-Open No. 2001-28765 discloses a technology for recording a photographed object as three-dimensional information in advance when producing programs, so that it is possible to observe the photographed object from different viewpoint, based on an indication of a viewing audience.

The Japanese Patent Laid-Open No. 11-45351 discloses a technology operable to provide an identical three-dimensional image regarding a viewing audience, based on image material information selected by the viewing audience from plural image material information, transmitted from a broadcast station according to the viewing audience's prediction.

As a means for giving the feeling as though the viewing audience is watching the events directly when broadcasting programs such as a sports program, generating an image with a visual field of a player participating in the events, is expected. However, in order to achieve this purpose using the conventional method, it is needed for a player to wear an apparatus such as a visual input apparatus, therefore, it is difficult to achieve that purpose in active sports.

In addition, for example in a theme park or in a sightseeing area, there is a service to provide a picture in which a person participating in an attraction is photographed, to the person. However, since the image capturing apparatus such as a camera is fixed at a predetermined position, it is difficult to obtain a player's picture from an anterior view.

SUMMARY OF THE INVENTION

Therefore, it is an object of the present invention to provide an image generating apparatus, an image generating method and an image generating program, which are capable of overcoming the above drawbacks accompanying the conventional art. The above and other objects can be achieved by combinations described in the independent claims. The dependent claims define further advantageous and exemplary combinations of the present invention.

According to the first aspect of the present invention, an image generating apparatus for generating a visual field image seen from a photographed person who is photographed in at least one part of plural two-dimensional images, based on the plural two-dimensional images captured by plural image capturing apparatuses, comprises: a position detector for detecting a position of the photographed person, based on at least two of the plural two-dimensional images; a visual direction detector for detecting a visual direction of the photographed person based on at least one of the plural two-dimensional images; a three-dimensional information generating section for generating three-dimensional information of space that is photographed, based on at least two of the two-dimensional images, and an image generating section for generating the visual field image seen from the position of the photographed person along the visual direction, based on the three-dimensional information, the position of the photographed person, and the visual direction of the photographed person.

The visual direction detector may include a partial image extracting section for extracting each of partial images corresponding to the photographed person's face and eyes, which are photographed in at least one of the plural two-dimensional images; and a visual direction calculator for calculating the visual direction based on each of the partial images corresponding to the face and eyes, extracted by the partial image extracting section.

The image generating apparatus may further comprise an image capturing apparatus selector for selecting at least two image capturing apparatuses which photograph a visual field of the photographed person, from the plural image capturing apparatuses, based on the position of the photographed person and the visual direction of the photographed person, and the three-dimensional information generating section may generate the three-dimensional information, based on the at least two of the two-dimensional images captured by at least the two image capturing apparatuses, which are selected by the image capturing apparatus selector.

The image capturing apparatus selector may select at least two image capturing apparatuses, of which relative angle formed by a photographing direction and the visual direction is equal to or less than a predetermined threshold angle, from the plural image capturing apparatuses, based on the position of the photographed person and the visual direction of the photographed person.

Each of the plural image capturing apparatuses may obtain a moving image by photographing the two-dimensional image in each predetermined interval time. The position detector may detect each of the positions of the photographed person in each of the time intervals, based on at least two of the plural two-dimensional images, captured in the interval times respectively and the visual direction detector may detect each of the visual directions of the photographed person in each of the interval times, based on at least one of the plural two-dimensional images captured in the interval times respectively. The image generating apparatus may further comprise an interpolating section for calculating a position or visual direction of the photographed person in an interval time, based on an another position or an another visual direction in at least an another interval time before or after the time interval, when it is impossible to detect the position or visual direction of the photographed person in the interval time by using the two-dimension image in the time interval, and the three-dimensional information generating section may generate each of the three-dimensional information in each of the interval times, based on at least two of the plural two-dimensional images captured in the interval times respectively, and the image generating section may generate the visual field image based on the three-dimensional information, the position of the photographed person, and the face direction of the photographed person, in each time interval.

According to the second aspect of the present invention an image generating method for generating a visual field image by a computer, which the image is seen from a photographed person who is photographed in at least one part of the plural two-dimensional images, based on plural two-dimensional images captured by plural image capturing apparatuses, comprises a position detecting step for detecting a position of the photographed person based on at least two images of the plural two-dimensional images, by the computer; a visual direction detecting step for detecting a visual direction of the photographed person, based on at least one of the plural two-dimensional images by the computer; a three-dimensional information generating step for generating three-dimensional information of space that is photographed, based on at least two of the two-dimensional images by the computer; and an visual field image generating step for generating the visual field image seen from the position of the photographed person along the visual direction of the photographed person, based on the three-dimensional information, the position of the photographed person, and the visual direction, by the computer.

According to the third aspect of the present invention, a computer readable medium storing thereon a program for generating a visual field image by a computer, which the image is seen from a photographed person who is photographed in at least one part of the plural two-dimensional images, based on plural two-dimensional images captured by plural image capturing apparatuses, the program comprises a position detecting module for detecting a position of the photographed person, by the computer; a visual direction detecting module for detecting a visual direction of the photographed person, based on at least one of the plural two-dimensional images by the computer; a three-dimensional information generating module for generating three-dimensional information of space that is photographed, based on at least two of the two-dimensional images, by the computer; and an image generating module for generating an image seen from the position of the photographed person along the face direction, based on the three-dimensional information, the position of the photographed person, and the face direction of the photographed person.

According to the forth aspect of the present invention, an image generating apparatus for generating a visual field image seen from a photographed person who is photographed in at least one part of plural two-dimensional images, based on the plural two-dimensional images captured by plural image capturing apparatuses, comprises a photographed person's position detector for detecting a position of the photographed person, based on at least two of the plural two-dimensional images; a photographed person's direction detector for detecting a face direction of the photographed person; a three-dimensional information generating section for generating three-dimensional information of space that is photographed, based on at least two of the two-dimensional images; and an image generating section for generating the visual field image seen from the position of the photographed person along the face direction, based on the three-dimensional information, the position of the photographed person, and the face direction of the photographed person.

The photographed person's direction detector may detects a visual direction of the photographed person, as the face direction of the photographed person, and the image generating section may generate the visual field image seen from the position of the photographed person along the visual direction, based on the three-dimensional information, the position of the photographed person, and the visual direction of the photographed person. The photographed person's direction detector may detect the visual direction based on at least one of the plural two-dimensional images.

The photographed person's direction detector may include a partial image extracting section for extracting each of partial images corresponding to the photographed person's face and eyes, which are photographed in at least one of the plural two-dimensional images; and a visual direction calculator for calculating the visual direction based on each of the partial images corresponding to the face and eyes, extracted by the partial image extracting section. The image generating apparatus may further comprise an image capturing apparatus selector for selecting at least two image capturing apparatuses which photograph a visual field of the photographed person, from the plural image capturing apparatuses, based on the position of the photographed person and the visual direction of the photographed person, and the three-dimensional information generating section may generate the three-dimensional information, based on the at least two of the two-dimensional images captured by at least the two image capturing apparatuses, which are selected by the image capturing apparatus selector.

The image capturing apparatus selector may select at least two image capturing apparatuses, of which relative angle formed by a photographing direction and the visual direction is equal to or less than a predetermined threshold angle, from the plural image capturing apparatuses, based on the position of the photographed person and the visual direction of the photographed person. The image capturing apparatus selector may select at least two image capturing apparatuses, of which relative angle formed by a photographing direction and the visual direction is equal to or less than a predetermined threshold angle, from the plural image capturing apparatuses, based on the position of the photographed person and the visual direction of the photographed person.

Each of the plural image capturing apparatuses may obtain a moving image by photographing the two-dimensional image in each predetermined interval time and the photographed person's position detector may detect each of the positions of the photographed person in each of the time intervals, based on at least two of the plural two-dimensional images, captured in the interval times respectively; and the photographed person's direction detector may detect each of the visual directions of the photographed person in each of the interval times, based on at least one of the plural two-dimensional images captured in the interval times respectively. The image generating apparatus may further comprise an interpolating section for calculating a position or visual direction of the photographed person in an interval time, based on an another position or an another visual direction in at least an another interval time before or after the time interval, when it is impossible to detect the position or visual direction of the photographed person in the interval time by using the two-dimension image in the time interval, and the three-dimensional information generating section may generate each of the three-dimensional information in each of the interval times, based on at least two of the plural two-dimensional images captured in the interval times respectively, and the image generating section may generates the visual field image based on the three-dimensional information, the position of the photographed person, and the face direction of the photographed person, in each time interval.

The photographed person's position detector may detect each of the positions of the plural photographed persons, based on at least two of the plural two-dimensional images, and calculates an average position by averaging the positions of the plural photographed persons, and the photographed person's direction detector may detect each of the face directions of the plural photographed persons, and calculates an average direction by averaging the plural face directions of the plural photographed persons, and the image generating section may generate the visual field image seen from the average position along the average direction, based on the three-dimensional information, the average position of the plural photographed persons, and the average direction of the plural photographed persons.

The image generating apparatus may further comprises a central region detector for detecting a central region so that a density regarding the number of extensions which extend from each of the plural photographed persons along each of the face directions of the photographed persons, is equal to or greater than predetermined density; and a main subject person selector for selecting photographed persons from the plural photographed persons as main subject persons so that the extensions which extend from the photographed person along the face directions of the photographed persons intersect at the central region. The photographed person's position detector may calculate an average position by averaging the positions of the main subject persons based on at least two of the plural two-dimensional images, and the photographed person's direction detector may calculate an average direction by averaging the face directions of the main subject persons, and the image generating section may generate the visual field image seen from the average position along the average direction, based on the three-dimensional information, the average position, and the average direction.

The photographed person's position detector may detect each of the positions of the plural photographed persons, based on at least two of the plural two-dimensional images and calculates an average position by averaging the positions of the plural photographed persons and the image generating apparatus may further comprise a main subject person selector for selecting a photographed person as a main subject person from the plural photographed persons so that the selected position of the photographed person is nearest to the average position. The photographed person's direction detector may detect the face direction of the main subject person, and the image generating section may generate the visual field image seen from the position of the main subject person along the face direction of the main subject person, based on the three-dimensional information, the position of the main subject person, and the face direction of the main subject person.

The image generating apparatus may further comprise a viewer's position detector for detecting a position of a viewer who observes at least one of the plural photographed persons; a viewer's direction detector for detecting a face direction of the viewer; a main subject person selector for identifying the photographed person the viewer is observing as a main subject person, based on the position of the viewer and the face direction of the viewer. The photographed person's position detector may detect a position of the main subject person, based on at least two of the plural two-dimensional images, and the photographed person's direction detector may detect a face direction of the main subject person, and the image generating section may generate the visual field image seen from the position of the main subject person along the face direction of the main subject person, based on the three-dimensional information, the position of the main subject person, and the face direction of the main subject person.

The viewer's position detector may detect the position of the viewer, based on at least two of the plural two-dimensional images, and the viewer's direction detector may detect the face direction of the viewer based on at least one of the plural two-dimensional images. The viewer's position detector may detect each of the positions of the viewers, and calculate an average position by averaging the positions of the plural viewers and the viewer's direction detector may detect each of the face directions of the viewers, and calculate an average direction by averaging the face directions of the plural viewers, and the main subject person selector may identify the photographed person the plural viewers are observing as a main subject person, based on the average position of the plural viewers and the average direction of the plural viewers.

The image generating section may generate the visual field image including a predetermined subject, which the visual field image is seen from the position of the photographed person along the face direction, based on the three-dimensional information, the position of the photographed person, and the face direction of the photographed person.

According to the fifth aspect of the present invention, an image generating apparatus for generating an image including a photographed person in at least one part of the plural two-dimensional images, based on plural two-dimensional images captured by plural image capturing apparatuses, may comprise a photographed person's position detector for detecting a position of the photographed person; a photographed person's direction detector for detecting a face direction of the photographed person; a three-dimensional information generating section for generating three-dimensional information of space that is photographed, based on at least two of the two-dimensional images; a viewpoint deciding section for deciding a viewpoint which is substantially on an extension along the face direction of the photographed person, based on the position and face direction of the photographed person; and an image generating section for generating an image including the photographed person, seen from the viewpoint, based on the three-dimensional information and the position of the viewpoint.

The photographed person's position detector may detect the position of the photographed person based on at least two images of the two-dimensional images, and the photographed direction detector may detect the visual direction of the photographed person as the face direction, and the viewpoint deciding section may decide the viewpoint which is substantially on an extension along the visual direction of the photographed person, based on the position and visual direction of the photographed person. The photographed person's direction detector may detect the visual direction of the photographed person, based on at least one of the plural two-dimensional images.

The photographed person's position detector may detect each of the positions of the plural photographed persons and calculate an average position by averaging the positions of the plural photographed persons. The photographed person's direction detector may detect each of the face directions of the plural photographed persons and calculate an average direction by averaging the face directions of the plural photographed persons, and the viewpoint deciding section may decide the viewpoint which is substantially on an extension, extending from the average position along the average direction, and the image generating section may generate an image including the plural photographed persons seen from the position of the viewpoint, based on the three-dimensional information and the position of the viewpoint.

The image generating apparatus may further comprising a central region detector for detecting a central region so that a density regarding the number of extensions which extend from each of the plural photographed persons along each of the face directions of the photographed persons, is equal to or greater than predetermined density; and a main subject person selector for selecting photographed persons from the plural photographed persons as main subject persons so that the extensions which extend from the photographed person along the face directions of the photographed persons intersect at the central region. The photographed person's position detector may calculate an average position by averaging the positions of the main subject persons based on at least two of the plural two-dimensional images, and the photographed person's direction detector may calculate an average direction by averaging the face directions of the main subject persons, and the image generating section may generate the visual field image seen from the average position along the average direction, based on the three-dimensional information, the average position, and the average direction.

The photographed person's position detector may detect each of the positions of the plural photographed persons, and calculate an average position by averaging the positions of the plural photographed persons, and the image generating apparatus may further comprise a main subject person selector for selecting a photographed person as a main subject person from the plural photographed persons so that the selected position of the photographed person is nearest to the average position. The photographed person's direction detector may detect the face direction of the main subject person, and the viewpoint deciding section may decide a viewpoint which is substantially be on an extension extending from the position of the main subject person along the face direction of the main subject person, based on the position and face direction of the main subject person, and the image generating section may generate an image including the plural photographed persons seen from the position of the viewpoint, based on the three-dimensional information and the position of the viewpoint. The image generating section may generate an image including both the photographed person seen from the position of the viewpoint and a predetermined subject, based on the three-dimensional information and the position of the viewpoint.

According to the sixth aspect of the present invention, an image generating method for generating a visual field image by a computer, which the image is seen from a photographed person who is photographed in at least one part of the plural two-dimensional images, based on plural two-dimensional images captured by plural image capturing apparatuses, comprises a photographed person's position detecting step for detecting a position of the photographed person based on at least two images of the plural two-dimensional images, by the computer; a photographed person's direction detecting step for detecting a face direction of the photographed person, by the computer; a three-dimensional information generating step for generating three-dimensional information of space that is photographed, based on at least two of the two-dimensional images by the computer; and an image generating step for generating the visual field image seen from the position of the photographed person along the face direction of the photographed person, based on the three-dimensional information, the position of the photographed person, and the face direction, by the computer.

According to the seventh aspect of the present invention, an image generating method for generating a visual field image by a computer, which the image is seen from a photographed person who is photographed in at least one part of the plural two-dimensional images, based on plural two-dimensional images captured by plural image capturing apparatuses, comprises a photographed person's position detecting step for detecting a position of the photographed person, by the computer; a photographed person's direction detecting step for detecting a face direction of the photographed person, by the computer; a three-dimensional information generating step for generating section for generating three-dimensional information of space that is photographed, based on at least two of the two-dimensional images, by the computer; a viewpoint deciding step for deciding a viewpoint which is substantially on an extension of the face direction along the photographed person, based on the position and direction of the photographed person, by the computer; and an image generating step for generating an image including the photographed person seen from the viewpoint, based on the three-dimensional information and the position of the viewpoint, by the computer.

According to the eighth aspect of the present invention, a computer readable medium storing thereon a program for generating a visual field image by a computer, which the image is seen from a photographed person who is photographed in at least one part of the plural two-dimensional images, based on plural two-dimensional images captured by plural image capturing apparatuses, the program comprises a photographed person's position detecting module for detecting a position of the photographed person; a photographed person's visual direction detecting module for detecting a face direction of the photographed person; a three-dimensional information generating module for generating three-dimensional information of space that is photographed, based on at least two of the two-dimensional images; an image generating module for generating an image seen from the position of the photographed person along the face direction, based on the three-dimensional information, the position of the photographed person, and the face direction of the photographed person.

According to the ninth aspect of the present invention, a computer readable medium storing thereon a program for generating an image including a photographed person in at least one part of the plural two-dimensional images, based on plural two-dimensional images captured by plural image capturing apparatuses, the program comprises a photographed person's position detecting module for detecting a position of the photographed person; a photographed person's direction detecting module for detecting a face direction of the photographed person; a three-dimensional information generating module for generating three-dimensional information of space that is photographed, based on at least two of the two-dimensional images; a viewpoint deciding module for deciding a viewpoint which is substantially on an extension along the face direction of the photographed person, based on the position and face direction of the photographed person; and an image generating module for generating an image including the photographed person, seen from the viewpoint, based on the three-dimensional information and the position of the viewpoint.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 6 shows a method for generating a visual line of a visual field image, according to the first modification of this embodiment.

FIG. 6A shows a method for generating a visual line 630a of the visual field image by averaging the visual lines of plural photographed persons 600a.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
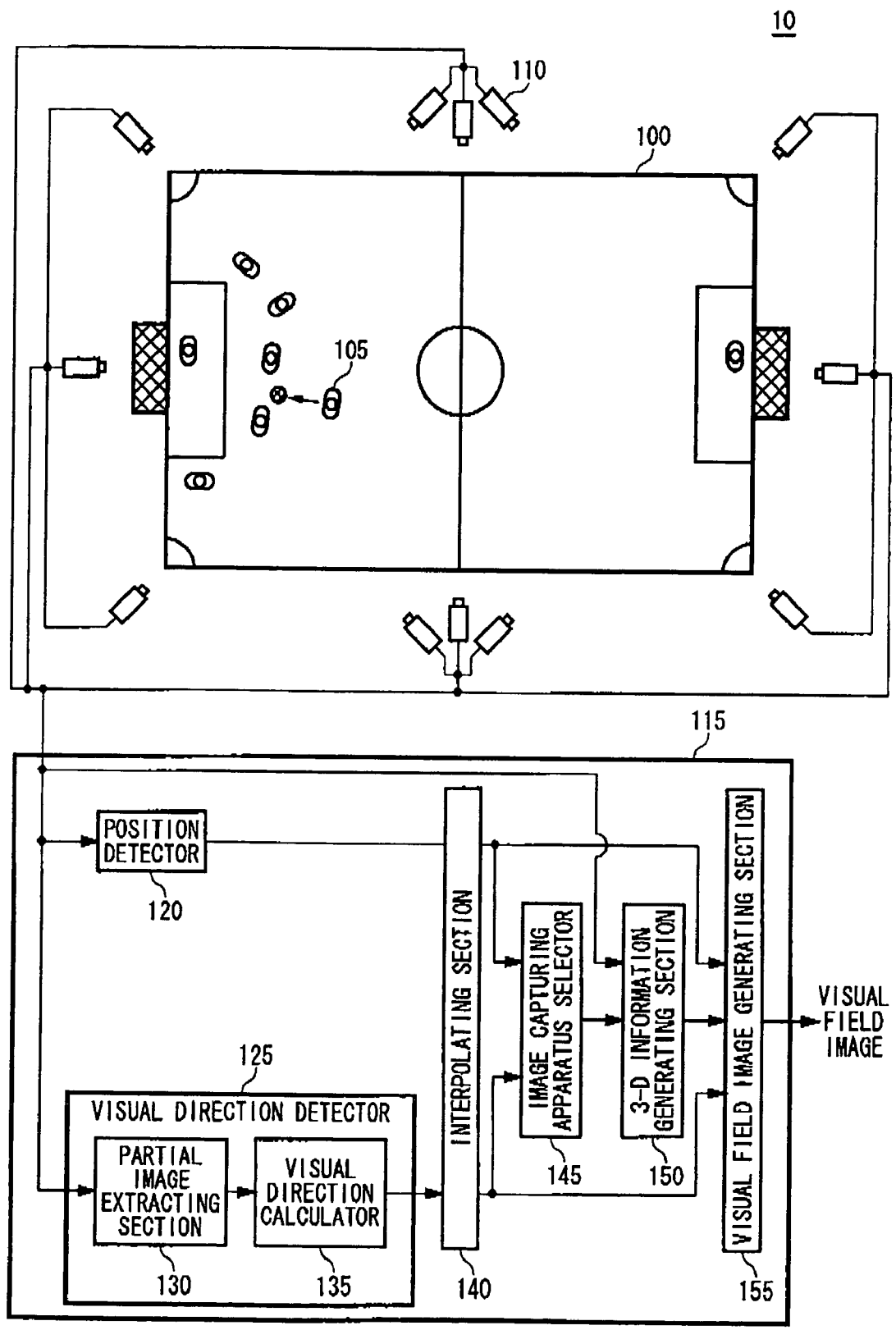
FIG. 1 is a configuration showing an image generating system 10 according to an embodiment of the present invention

FIG. 1 is a configuration showing an image generating system 10 according to an embodiment of the present invention. It is an object for the image generating system 10 to photograph a photographed field 100 as a subject using plural image capturing apparatuses 110 and to generate a visual field image seen from a photographed person who is photographed in at least a part of plural two-dimensional images, based on plural two-dimensional images captured by plural image capturing apparatuses 110. Thus, the image generating system 10 can generate an image seen from a player participating in sports events. In the present invention, the term "visual field image" is an image having a visual field seen from a person or an optical apparatus.

The image generating system 10 includes the photographed field 100, plural image capturing apparatuses 110, and an image generating apparatus 115. The photographed field 100 may be a field for playing ball games such as soccer, a ring for playing combat sports such as a sumo or a wrestling, or a running track for athletic sports. The photographed field 100 will be explained as a soccer field, hereinafter.

The plural image capturing apparatuses 110 are provided at the periphery of the photographed field 100, and photograph a person such as a player playing in the photographed field 100 or a ball used in the ball games.

The image generating apparatus 115 generates a visual field image seen from a photographed person who is photographed in at least one part of the plural two-dimensional images, based on plural two-dimensional images captured by plural image capturing apparatuses 110. For example, the image generating apparatus 115 generates an image that is not directly captured by the image capturing apparatus 110, by generating a visual field image of a photographed person 105 as a player, who shoots a goal The image generating apparatus 115 includes a position detector 120, a visual direction detector 125, an interpolation section 140, an image capturing apparatus selector 145, a three-dimensional information generating section 150, and a visual field image generating section 155. The position detector 120 is an example of the photographed person's position detector according to the present invention, and detects a position of the photographed person 105. According to the present embodiment, the position detector 120 detects a position of the photographed person 105, based on at least two of the plural two-dimensional images captured by the image capturing apparatus 110.

The visual direction detector 125 is an example of the photographed person's direction detector according to the present invention, and detects a face direction of the photographed person 105. According to the present embodiment, the visual direction detector 125 detects a visual direction of the photographed person 105 as the face direction. In this case, the visual direction detector 125 may detect the visual direction of the photographed person 105 based on at least one of the plural two-dimensional images. The visual direction detector 125 includes a partial image extracting unit 130 for extracting each of partial images corresponding to the photographed person's face and eyes, which are photographed in at least one of the plural two-dimensional images and a visual direction calculator 135 for calculating the visual direction based on each of the partial images corresponding to the face and eyes, extracted by the partial image extracting unit 130.

When generating the visual field images of the photographed person 105 as a moving image, if the position or direction of the photographed person 105 in a timing is not detected because the photographed person 105 hides behind another player in this timing, the interpolation section 140 calculates this position or visual direction in the corresponding timing.

The image capturing apparatus selector 145 selects at least two image capturing apparatuses 110 which photograph the visual field of the photographed person 105, from the plural image capturing apparatuses 110, based on the position and visual direction of the photographed person, as the image capturing apparatuses 110 for outputting the two-dimensional images to generate the visual field images. The three-dimensional information generating section 150 generates three-dimensional information of photographed space, based on at least two of the two-dimensional images captured by the image capturing apparatuses 110. More specifically, the three-dimensional information generating section 150 generates the three-dimensional information based on the at least two of the two-dimensional images captured by at least the two image capturing apparatuses 110, which are selected by the image capturing apparatus selector 145.

The visual field image generating section 155 is an example of the image generating unit according to the present invention, and generates the visual field image seen from the position of the photographed person 105 along the face direction of the photographed person 105, based on the three-dimensional information, and the position and face direction of the photographed person 105. In other words, according to this embodiment, the visual field image generating section 155 generates the visual field image seen from the position of the photographed person 105 along the visual direction, based on the three-dimensional information, and the position and visual direction of the photographed person 105.

According to the image generating system 10 as described above, it is possible to generate a visual field image seen from the photographed person 105, based on plural two-dimensional images captured by the plural image capturing apparatus 110, without mounting an apparatus for detecting the visual direction to the photographed person 105.

Figure 2:
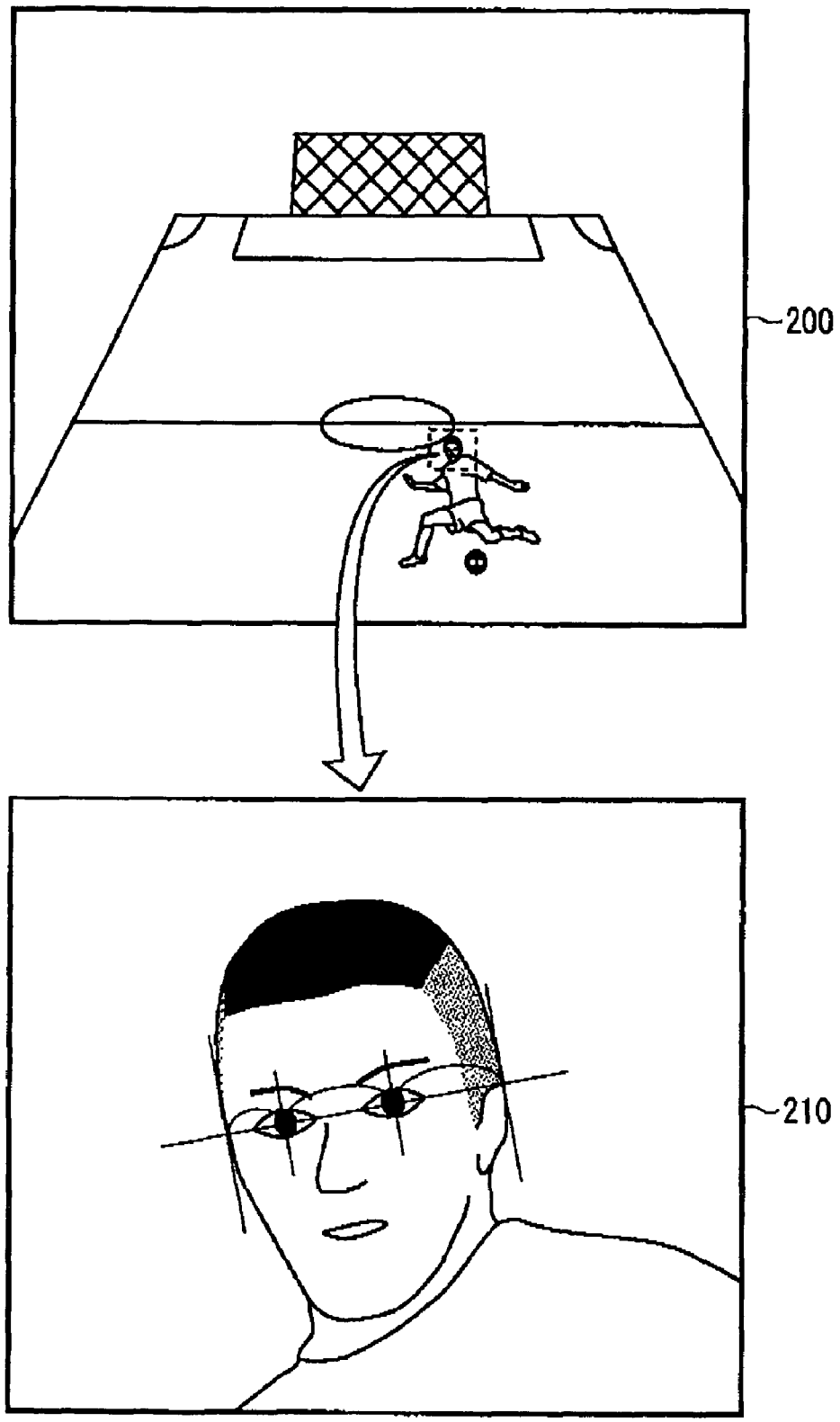
FIG. 2 is an example showing a method for extracting a partial image by the partial image extracting section 130 according to the present embodiment.

FIG. 2 is an example showing a method for extracting a partial image by the partial image extracting section 130 according to this embodiment. The partial image extracting section 130 selects a two-dimensional image 200 in which the photographed person 105 is photographed, from the plural two-dimensional images captured by each of the plural image capturing apparatuses 110. In this case, the partial image extracting section 130 may select a two-dimensional image in which the photographed person 105 is considered to be most finely photographed with an anterior view, or a two-dimensional image in which both eyes of the photographed person 105 are considered to be surely photographed.

Next, the partial image extracting unit 130 extracts a partial images corresponding to the photographed person 150's face and eyes, which are photographed in at least one of the plural two-dimensional images, as the partial image 210. The visual direction calculator 135 detects the face direction of the photographed person 105, based on the partial image 210. In this case, the visual direction calculator 135 may detect the visual direction of the photographed person 105 as the face direction. More specifically, the visual direction calculator 135 may calculate the face direction and/or the visual direction, according to a position of a region of the eyes corresponding to a position of a region of the face in the partial image. Alternatively, the visual direction calculator 135 may calculate the face direction and/or the visual direction, according to both a position of regions of the eyes corresponding to a position of a region of the face in the partial image and a position of regions of the pupils corresponding to the position of regions of the eyes.

As described above, the visual direction detector 125 can calculate the face direction or visual direction of the photographed person 105, based on the two-dimensional image 200 without making the photographed person 105 wearing the apparatus for detecting the visual direction. In addition, alternatively, the visual direction detector 125 may generate three-dimensional information of the photographed person 105 based on at least two of the plural two-dimensional images captured by the plural image capturing apparatuses 110, and detect the visual direction of the photographed person 105 by detecting the face direction and/or the visual direction based on the three-dimensional information.

Figure 3:
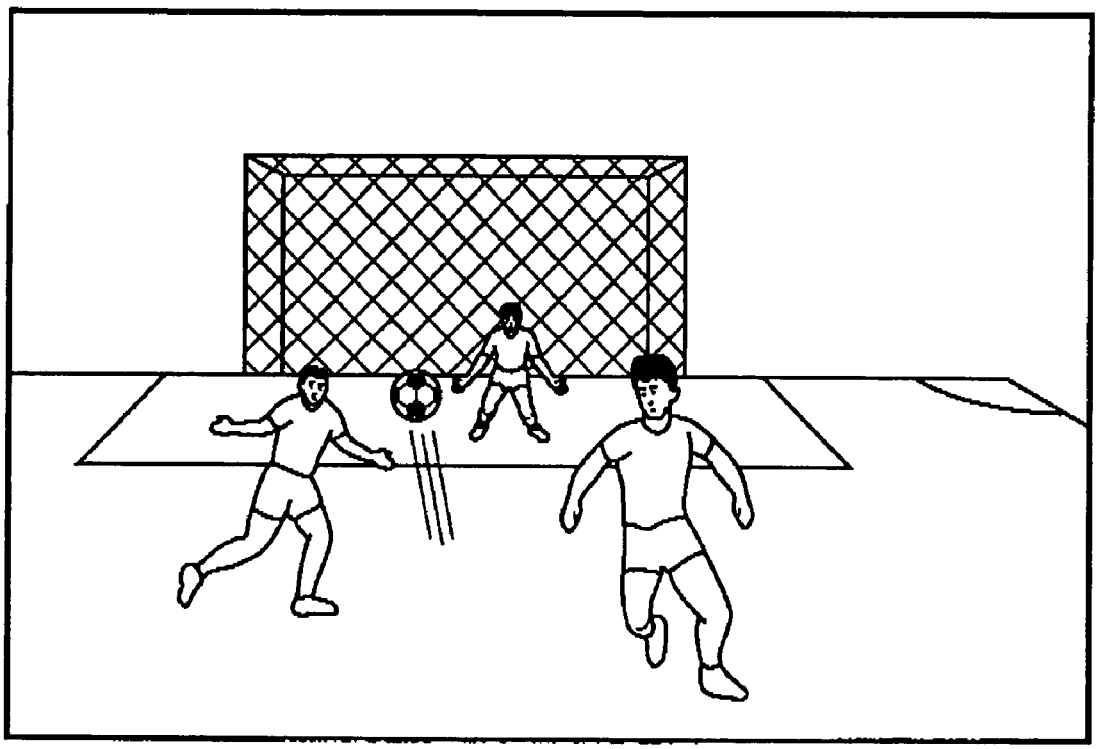
FIG. 3 is an example showing a visual field image 300, generated by the image generating apparatus 115 according to the present embodiment.

FIG. 3 is an example showing a visual field image 300, generated by the image generating apparatus 115 according to present embodiment. The image capturing apparatus selector 145 makes the three-dimensional information generating section 150 select at least two of the two-dimensional images captured by the plural image capturing apparatuses 110, as the two-dimensional images to generate the visual field image 300, by selecting at least two of the plural image capturing apparatuses 110.

The three-dimensional information generating section 150 generates the three-dimensional information of photographed space, based on the at least two of the two-dimensional images selected by the image capturing apparatus selector 145. For example, the three-dimensional information generating section 150 may generate the three-dimensional information which includes position information and shape information of each of the subjects, using the parallax images of each of the subjects photographed in at least two two-dimensional images. The visual field image generating section 155 generates the visual field image 300 of the photographed person 105, based on the photographed person 105's position which is detected by the position detector 120, the photographed person 105's visual direction which is detected and calculated by the visual direction detector 125 and/or interpolation section 140, and the three-dimensional information which is generated by the three-dimensional information generating section 150.

According to the image capturing apparatus selector 145 as described above, the two-dimensional images are selected from the plural two-dimensional images to generate the visual field image 300, and consequently it is possible to restrict the number of the two-dimensional images for generating the visual field image 300, and it is possible to reduce calculation amounts, which are required to generate both the three-dimensional information by the three-dimensional information generating section 150 and the visual field image 300 by the visual field image generating section 155.

In the embodiment described above, the image capturing apparatus selector 145 may select at least two image capturing apparatuses 110, of which relative angle formed by the photographing direction and the visual direction of the photographed person 105 is equal to or less than a predetermined threshold angle, from the plural image capturing apparatuses 110, based on the position and visual direction of the photographed person 105. Therefore, the image capturing apparatus selector 145 can select two-dimensional images of which visual field is more similar to the visual direction, and reduce an error which occurs when generating the three-dimensional information.

Figure 4:
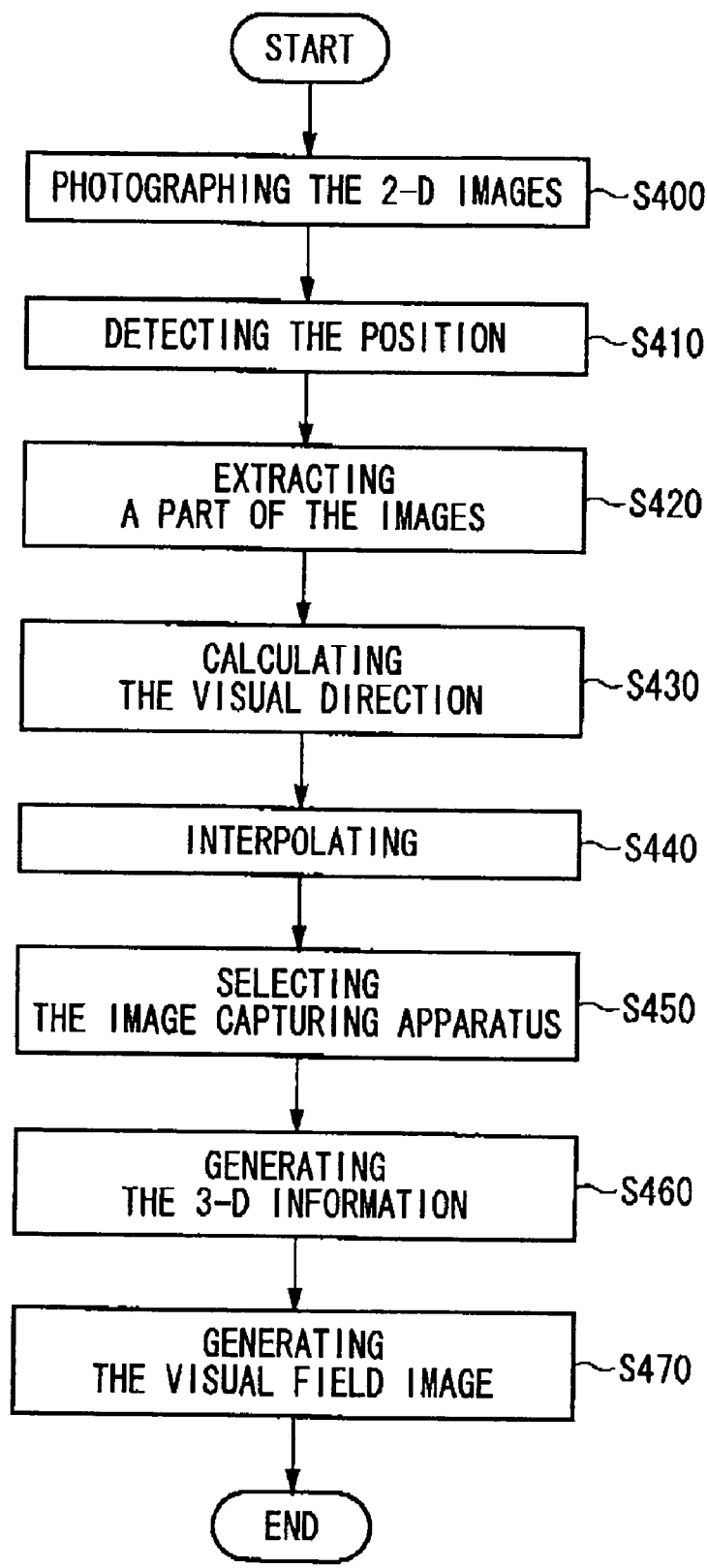
FIG. 4 is a flowchart of the image generating apparatus 115 according to the present embodiment.

FIG. 4 is a flowchart of the image generating apparatus 115 according to present embodiment. At first, the plural image capturing apparatuses 110 capture plural two-dimensional images (S400). Here, when generating the moving images corresponding to the visual field images, each of the plural image capturing apparatuses 110 obtains the moving images by capturing the two-dimensional images in each predetermined interval time, such as interval times of frames.

Next, the position detector 120 calculates a parallax and so forth based on at least two of the plural two-dimensional images captured by the image capturing apparatuses 110, and detects the position of the photographed person 105 (S410). Here, when generating the moving images of the visual field images, the position detector 120 detects each of the positions of the photographed person 105 in each of the interval times sequentially, based on at least two of the plural two-dimensional images captured in the interval times respectively.

Next, the partial image extracting section 130 included in the visual direction detector 125 selects at least one of the plural two-dimensional images, and extracts partial images corresponding to the face and eyes of the photographed person 105 in this two-dimensional images (S420). The visual direction calculator 135 included in the visual direction detector 125 calculates the face direction based on the partial image of the face and eyes, extracted by the partial image extracting section 130 (S430). More specifically, the visual direction calculator 135 calculates a visual direction as the face direction. Here, when generating the moving images of the visual field images, the partial image extracting section 130 selects at least one of the plural two-dimensional images captured in each of the interval times, and then detects the visual direction of the photographed person 105 in each of the interval times, based on the selected two-dimensional images.

Next, if it is impossible to detect the position or visual direction of the photographed person 105 in an interval time by using the two-dimension image in the time interval, the interpolation section 140 calculates the position or visual direction of the photographed person 105 in the time interval, based on an another position or an another visual direction in at least an another interval time before or after the time interval (S440). For example, the interpolation section 140 may calculate the position or visual direction of the photographed person 105 in the interval time, by interpolating the position or visual direction of the photographed person 105, in interval times before or after the interval time. Thus, the interpolation section 140 can calculate the position or visual direction of the photographed person 105 even if the poison or visual direction of the photographed person 105 is not detected temporarily. The interpolation section 140 can decide the position or visual direction of the photographed person 105 properly even in active sports.

Next, the image capturing apparatus selector 145 selects at least two image capturing apparatuses 110 which captures the visual field of the photographed person 105, from the plural image capturing apparatuses 110, based on the position and visual direction of the photographed person 105 (S405). Next, the three-dimensional information generating section 150 generates three-dimensional information of photographed space, based on at least two of the plural two-dimensional images captured by each of at least the two image capturing apparatuses 110 selected: by the image capturing apparatus selector 145 (S460). When generating moving images of the visual field images, the three-dimensional information generating section 150 generates the three-dimensional information in each of the interval times, based on at least two of the plural two-dimensional images captured in the interval times respectively.

Next, the visual field image generating section 155 generates a visual field image seen from the position of the photographed person 105 along the visual direction, based on the three-dimensional information, the position of the photographed person 105, and the visual direction of the photographed person 105 (S470). When generating the moving image of the visual field images, the visual field image generating section 155 generates the visual field images in each of the interval times, based on the three-dimensional information, the position of the photographed person 105 and the visual direction of the photographed person 105, captured in the interval times respectively.

In generating the visual field images, the visual field image generating section 155 may generate the visual field image including a predetermined subject, which the image is seen from the position of the photographed person 105 along the face direction, based on the three-dimensional information, and the position and face direction of the photographed person 105. More specifically, the visual field image generating section 155 includes the subject in the generated images by adjusting the position of the viewpoint, the visual direction and/or the view angle, according to the viewpoint, and the position and size of the subject, which are determined by the position detector 120 and the visual direction detector 125. Thus, the visual field image generating section 155 can include subjects, such as predetermined advertisements or scenes, in the visual field image.

Figure 5:
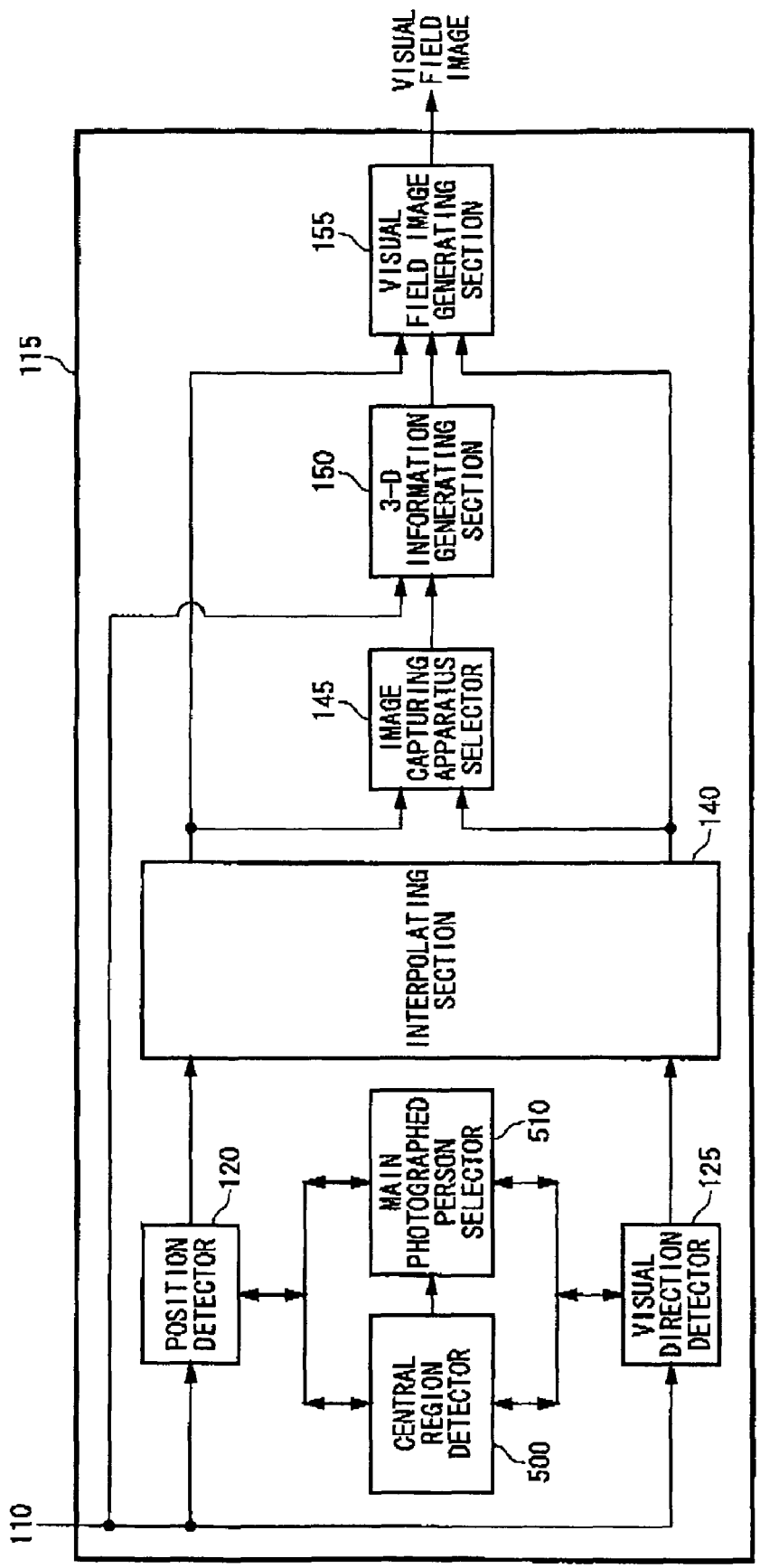
FIG. 5 is a first modification showing the image generating apparatus 115 according to present embodiment.

FIG. 5 is a first modification showing the image generating apparatus 115 according to present embodiment. According to the first modification the image generating apparatus 115 can decide the visual direction of the visual field image, based on the position and face direction of the plural photographed persons. Therefore, the image generating apparatus 115 can generate images with respect to sports, by photographing those persons who watch the sports as the photographed person.

According to the first modification the image generating apparatus 115 includes the position detector 120, the visual direction detector 125, a central region detector 500, a main subject person selector 510, the image capturing apparatus selector 145, the three-dimensional information generating section 150, and the visual field image generating section 155. Since the position detector 120, the 125, the image capturing apparatus selector 145, the three-dimensional information generating section 150, and the visual field image generating section 155 shown in FIG. 5 are substantially similar function and structure to those of the sections shown in FIG. 1, the description of these sections is omitted except for the difference from the sections shown in FIG. 1.

The position detector 120 detects each of the positions of the plural photographed persons, in a similar way to the position detector 120 in FIG. 1. The position detector 120 decides a reference position for the visual line of the visual field image, according to the positions of the plural photographed persons The position detector 120 and the visual direction detector 125 decide the visual line of the visual field image according to the face directions of plural photographed persons.

The central region detector 500 detects a region on which the plural persons' visual lines are focused. The main subject person selector 510 selects a photographed person, who contributes to the decision of the visual line of the visual field image, as a main subject person, from the plural photographed persons. The position detector 120 and the visual direction detector 125 decide the visual line of the visual field image based on the position and face direction of the main subject person decided by the main subject person selector 510.

Figure 6A:
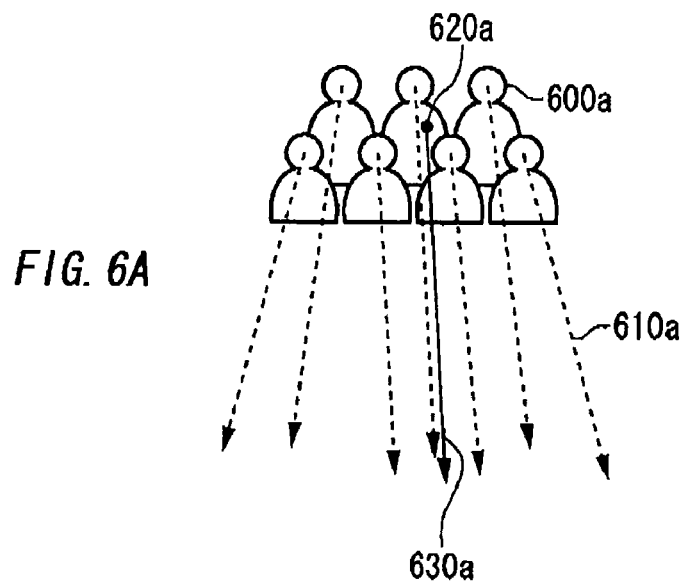
Figure 6B:
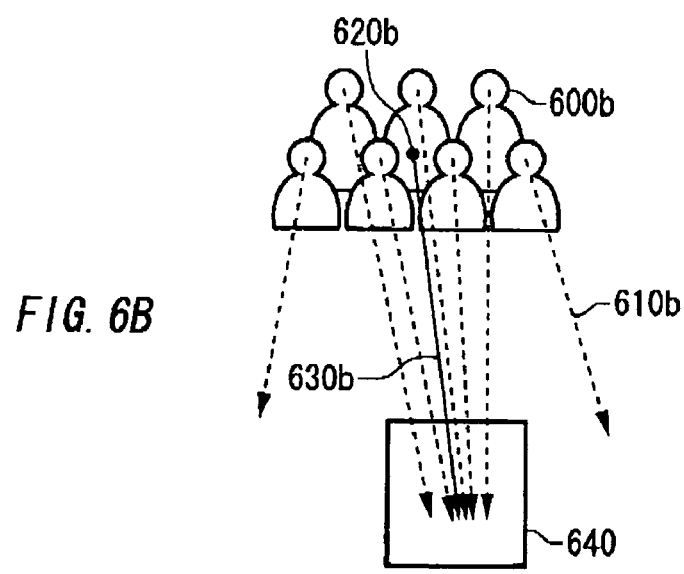
FIG. 6B shows a method for generating a visual line 630b, corresponding to a direction along which the majority of the plural photographed persons 600b see.
Figure 6C:
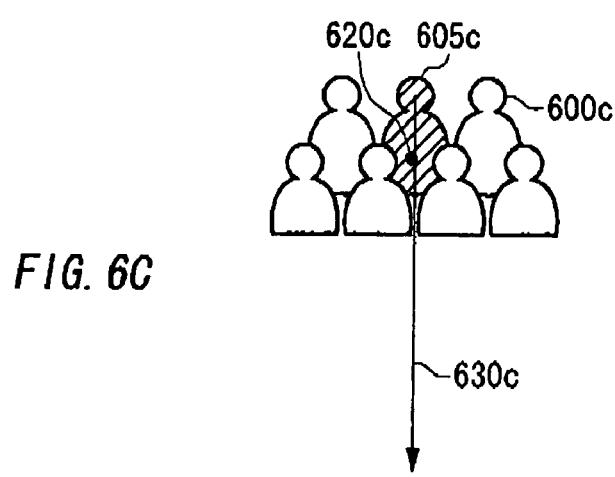
FIG. 6C shows a method for selecting a representative photographed person 605c from plural photographed persons 600c, and generating a visual line 630c.

FIG. 6 shows a method for generating a visual line of a visual field image, according to the first modification of this embodiment. According to this modification the image generating apparatus 115 generates the visual line by some of the methods, selected by a user from the methods with reference to FIGS. 6A-6C.

FIG. 6A shows a method for generating a visual line 630a of the visual field image by averaging the visual lines of plural photographed persons 600a. At first, the position detector 120 detects each of the positions of the plural photographed persons 600a and calculates an average position by averaging the positions of the plural photographed persons 600a. Next, the visual direction detector 125 detects each of the face directions of the plural photographed persons 600a and calculates an average direction by averaging the face directions of the plural photographed persons 600a.

According to these processing, the position detector 120 and the visual direction detector 125 can generate the visual line 630a, which extends from the average position along the average direction. In the following processing, each of the interpolation section 140, the image capturing apparatus selector 145, the three-dimensional information generating section 150, and the visual field image generating section 155 processes using both the average position calculated by the position detector 120 and the average direction calculated by the visual direction detector 125, in place of the position and face direction of one photographed person. Consequently, the visual field image generating section 155 can generate the visual field image seen from the average position along the average direction, based on the three-dimensional information, the average position and average direction of the plural photographed persons 600a.

FIG. 6B shows a method for generating a visual line 630b, corresponding to a direction along which the majority of the plural photographed persons 600b see. At first, the position detector 120 detects each of the positions of the plural photographed persons 600a and the visual direction detector 125 detects each of the face directions of the plural photographed persons 600b.

Next, the central region detector 500 detects a central region 640 so that a density regarding the number of extensions 610b which extends from each of the plural photographed persons 600b along each of the face directions of the photographed persons 600b, is equal to or more than predetermined density. In other words, the central region detector 500 divides the space into predetermined plural regions, and counts the number of the extensions 610b that cross each of the regions. The central region detector 500 decides a region, of which counted number is the largest, as the central region, for example. In this case, the "density" may be an area density defined as the number of the extensions 610b per a two-dimensional region or a volume density defined as the number of the extensions 610b per a three-dimensional region.

Next, the main subject person selector 510 selects some photographed persons from the plural photographed persons 600b as main subject persons so that the extensions extending from the photographed persons 600b along the face directions of the photographed persons 600b intersect at the central region. The position detector 120 calculates an average position 620b by averaging the positions of the main subject persons and the visual direction detector 125 calculates an average direction by averaging the face directions of the main subject persons.

According to these processing, the position detector 120 and the visual direction detector 125 can generate the visual line 630b, according to the positions and face directions of main subject persons. In the following processing, each of the interpolation section 140, the image capturing apparatus selector 145, the three-dimensional information generating section 150, and the visual field image generating section 155 processes using both the average position calculated by the position detector 120 and the average direction calculated by the visual direction detector 125, in place of the position and face direction of one photographed person. Consequently, the visual field image generating section 155 can generate the visual field image seen from the average position along the average direction, based on the three-dimensional information, the average position and average direction of the main subject persons.

FIG. 6C shows a method for selecting a representative photographed person 605c from plural photographed persons 600c, and generating a visual line 630c. At first, the position detector 120 detects each of the positions of the plural photographed persons 600c and calculates an average position 620c by averaging the positions of the plural photographed persons 600c. Next, the main subject person selector 510 selects a photographed person 605c as a main subject person from the plural photographed persons 600c so that the position of the selected photographed person is nearest to the average position 620c.

According to these processing, the position detector 120 and the visual direction detector 125 can generate the visual line 630c, based on the positions and face directions of main subject persons. In the following processing, each of the interpolation section 140, the image capturing apparatus selector 145, the three-dimensional information generating section 150, and the visual field image generating section 155 processes using both the average position of the main subject person calculated by the position detector 120 and the average direction of the main subject person calculated by the visual direction detector 125, in place of the position and face direction of one photographed person. Consequently, the visual field image generating section 155 can generate the visual field image seen from the position of the main subject person along the face direction, based on the three-dimensional information, and the position and face direction of the main subject person.

Figure 7:
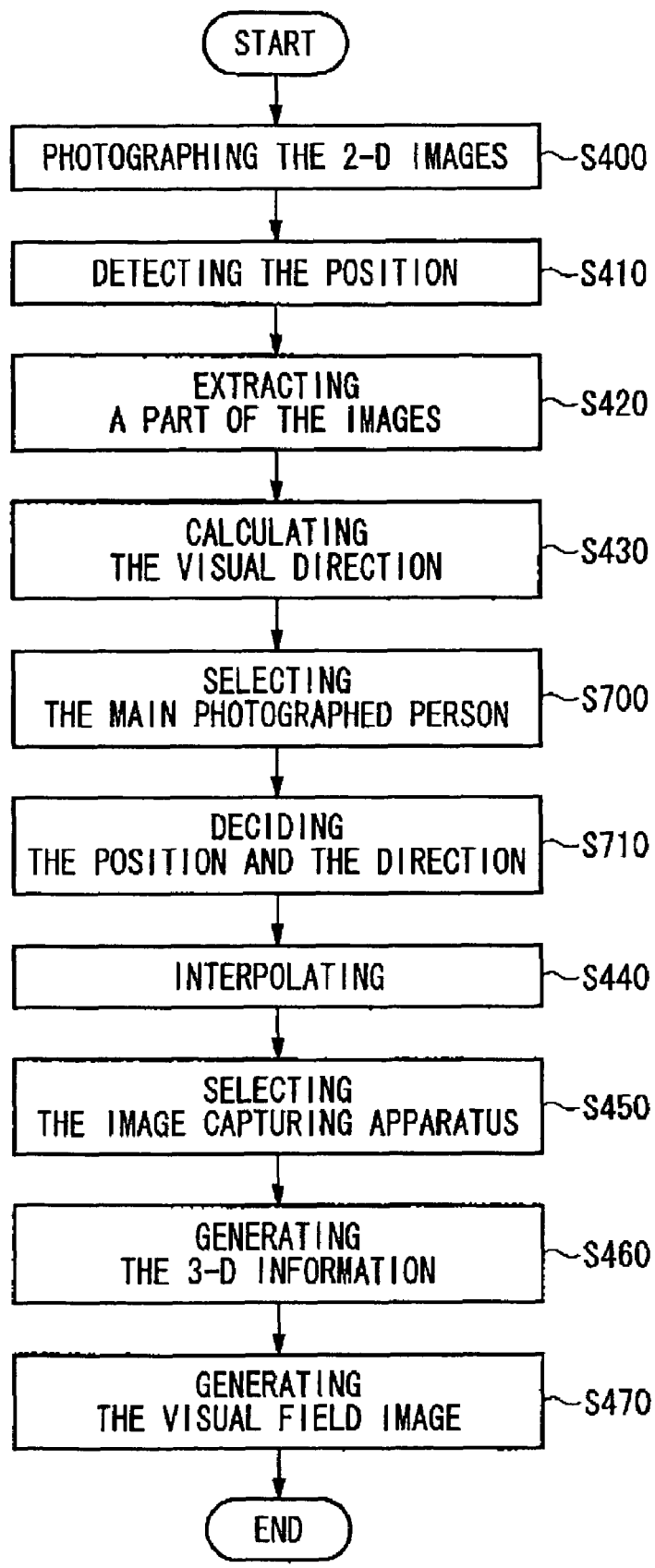
FIG. 7 is a flowchart of the image generating apparatus 115 according to the first modification of the present embodiment.

FIG. 7 is a flowchart of the image generating apparatus 115 according to the first modification of the present embodiment. In FIG. 7, since the steps having the same number substantially operate as the corresponding steps in FIG. 4 respectively, the description thereof is omitted except for the difference points from the explained steps in FIG. 4, The image generating apparatus 115 processes the steps from S400 to S430 in a similar way as explained with reference to FIG. 4. Next, when using each of the methods explained with reference to FIG. 6B and FIG. 6C, the main subject person selector 510 selects the main subject person, who contributes to the decision of the visual line (S700). In this case, when using the method in FIG. 6B, the central region detector 500 obtains the central region 640 as described with respect to FIG. 6B, and supplies the obtained central region 640 to the main subject person selector 510.

Next, the position detector 120 decides the reference position for the visual line and the visual direction detector 125 decides the visual direction (S710). In other words, when using the method in FIG. 6A, the position detector 120 calculates the average position by averaging positions of the plural photographed persons 600a, as the reference position for the visual line, and the visual direction detector 125 calculates the average direction by averaging face directions of the plural photographed persons 600a, as the visual direction. When using the method in FIG. 6B, the position detector 120 calculates the average position of the main subject persons by averaging positions of the main subject persons, as the reference position for the visual line, and the visual direction detector 125 calculates the average direction by averaging face directions of the main subject persons, as the visual direction. Alternatively, when using the method in FIG. 6C, the main subject person selector 510 selects a photographed person as a main subject person so that the photographed person's position is nearest to the average position of the plural photographed persons 600a, and the position detector 120 decides the position of the main subject persons as the reference position for the visual line, and the visual direction detector 125 decides the face direction of the main subject persons, as the visual direction.

In the following steps, the image generating apparatus 115 processes the steps from S440 to S470 by using the visual line that is decided in S710. According to the image generating apparatus 115 in the first modification, the visual line of the visual field image can be decided according to the position and face direction of the plural photographed persons, and therefore, the image including scenes on which the photographed persons focus their attentions can be generated properly.

Figure 8:
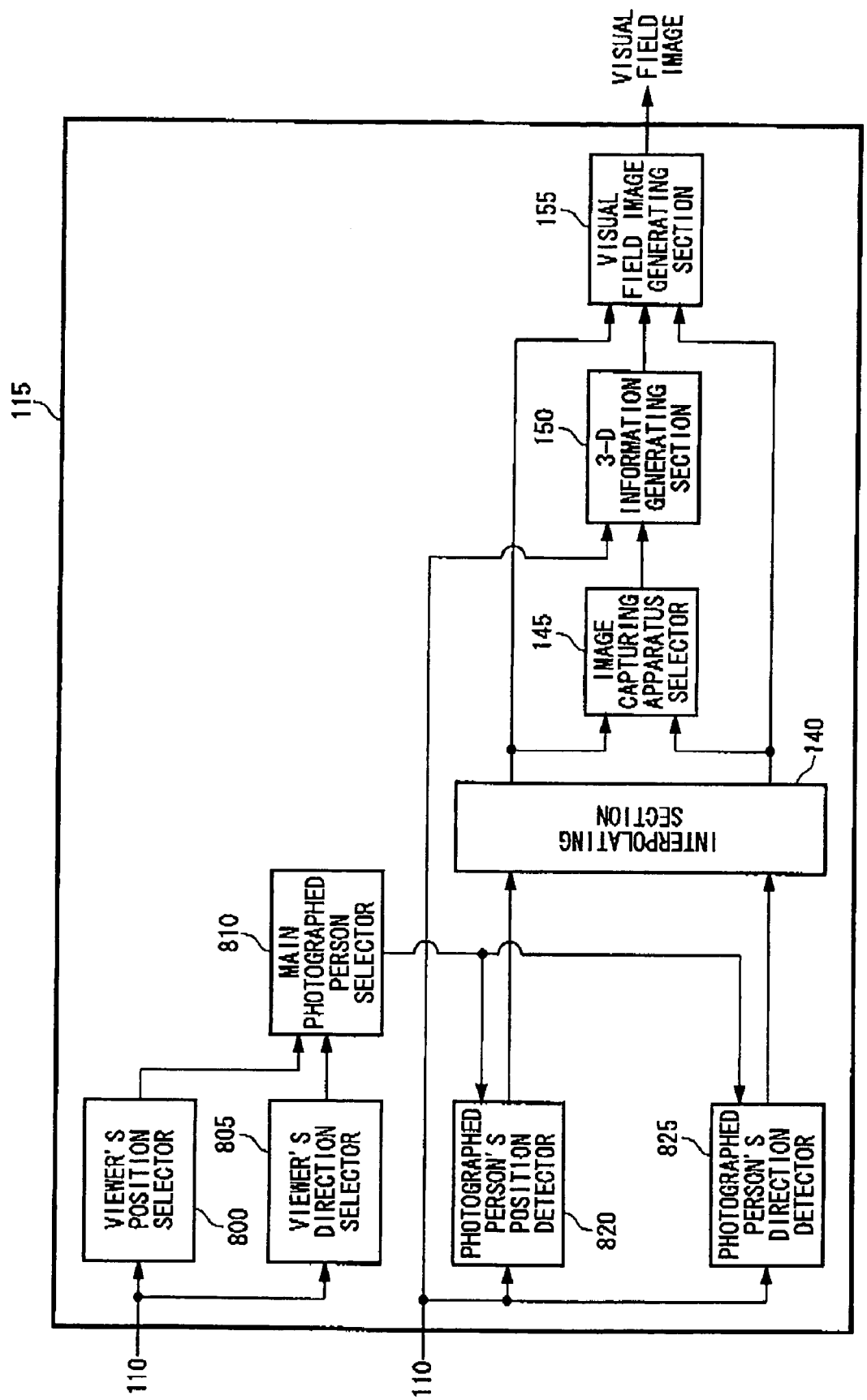
FIG. 8 is a configuration showing the image generating apparatus 115 according to the second modification of the present embodiment.

FIG. 8 is a configuration showing the image generating apparatus 115 according to the second modification of the present embodiment. According to the second modification the image generating apparatus 115 selects a photographed person a viewer observes, the viewer watching at least one photographed person, and generates a visual field images seen from the selected photographed person. Thus, for example, the image generating apparatus 115 can select someone of the sport players according to the visual line of the viewers who watch sports, and generate the visual field images seen from the selected sport player.

According to the second modification the image generating apparatus 115 includes a viewer's position detector 800, a viewer's direction detector 805, a main subject person selector 810, a photographed person's position detector 820, a photographed person's direction detector 825, the interpolation section 140, the image capturing apparatus selector 145, the three-dimensional information generating section 150, and the visual field image generating section 155. Since the interpolation section 140, the 145, the three-dimensional information generating section 150, and the visual field image generating section 155 shown in FIG. 8 are substantially similar function and structure to those of the sections shown in FIG. 1, the description of these sections is omitted except for the difference from units shown in FIG. 1.

The viewer's position detector 800 detects a position of the viewer, who observes at least one of the plural photographed persons 105. The viewer's position detector 800 may include the same function or configuration as the position detector 120, shown in FIG. 1. The viewer's direction detector 805 detects the face direction of the viewer. The viewer's direction detector 805 may include the same function or configuration as the visual direction detector 125, shown in FIG. 1 The main subject person selector 810 identifies the photographed person 105 watched by the viewer, based on the position and face direction of the viewer, as a main subject person. The photographed person's position detector 820 includes the same function or configuration as the position detector 120, shown in FIG. 1, and detects the position of the main subject person. The photographed person's direction detector 825 includes the same function or configuration as the visual direction detector 125, shown in FIG. 1, and detects the face direction of the main subject person.

Figure 9:
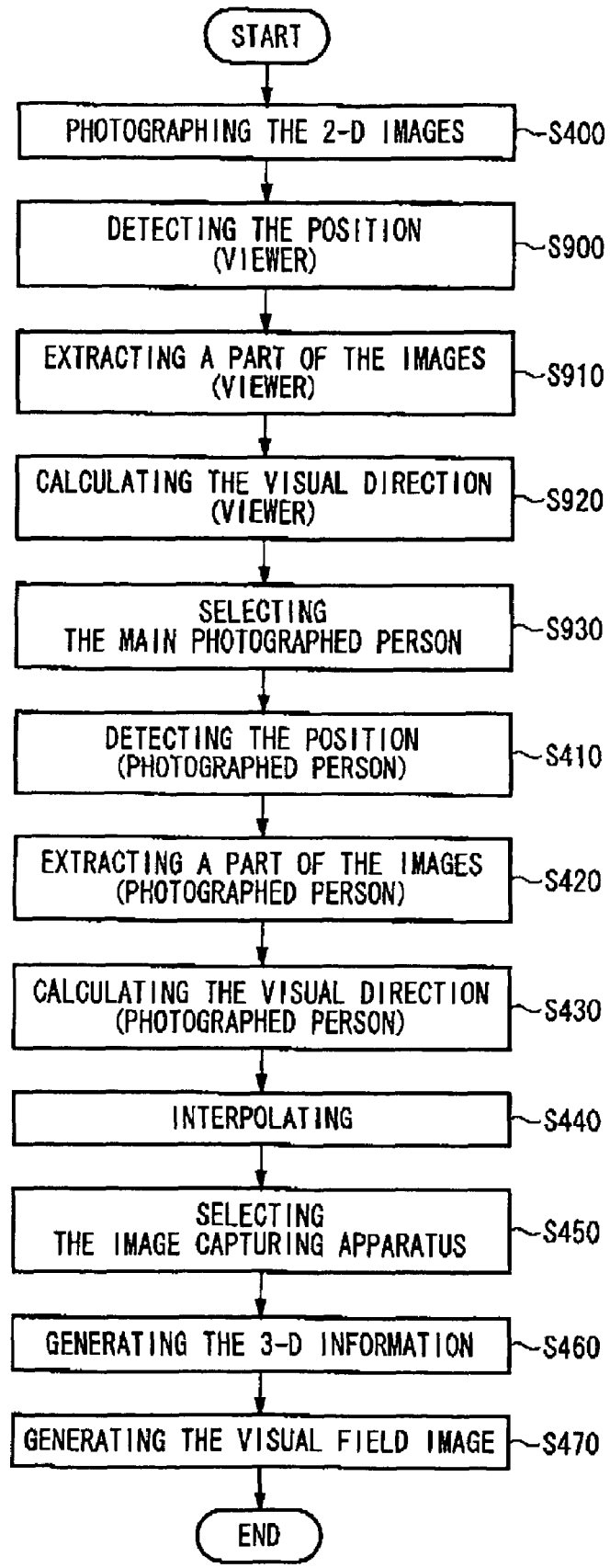
FIG. 9 is a flowchart of the image generating apparatus 115 according to the second modification of the present embodiment.

FIG. 9 is a flowchart of the image generating apparatus 115 according to the second modification of the present embodiment. At first, the plural image capturing apparatuses 110 capture plural two-dimensional images (S400). In this modification, both the photographed persons and the viewers are photographed in at least two of the plural two-dimensional images that are captured.

Next, the viewer's position detector 800 detects the position of the viewer (S900). According to this modification, the viewer's position detector 800 detects the position of the viewer based on at least two of the plural two-dimensional images that are captured, in a similar way to the position detector 120 in FIG. 1. Next, the viewer's direction detector 805 extracts partial images, corresponding to the face and eyes of the viewer from at least one of the two-dimensional images in which the viewer is photographed, (S910), and calculates the face direction based on the part images, in a similar way to the visual direction detector 125, in FIG. 1 (S920). More specifically, the viewer's direction detector 805 calculates the visual direction, as the face direction of the viewer.

Next, the main subject person selector 810 identifies the photographed person 105 that the viewer watches as the main subject person, by detecting those person who is approximately at the center of the visual field of the viewer, based on the position and face direction of the viewer (S930).

In the following steps, the image generating apparatus 115 processes the steps from S410 to S470 in a similar way to the steps in FIG. 4. Consequently, the image generating apparatus 115 can generate the visual field images seen from the position of the main subject person along the face direction, based on the three-dimensional information, and the position and face direction of the main subject person.

According to the image generating apparatus 115 of this modification, the visual field image seen from the photographed person that the viewer focuses his attention on can be generated. Therefore, for example, the image generating apparatus 115 can generate the visual field image seen from a pitcher whom a batter watches, when the viewers focus their attention on the batter.

In addition, when the plural viewers existing, the viewer's position detector 800 may calculate an average position by averaging the positions of the plural viewers, and the viewer's direction detector 805 may calculate an average direction by averaging the face directions of the plural viewers, and the main subject person selector 810 may identify the photographed person 105 that plural viewers are watching as the main subject person, base on the average position and average direction of the plural viewers, in a similar way to the method in FIG. 6A. Alternatively, according to the second modification the image generating apparatus 115 may generate a representative visual line of the viewers, based on the positions and face directions of the plural viewers in a similar way to the methods in FIG. 6B or 6C, and decide the main subject person based on the calculated visual line. To achieve these processes mentioned above, the image generating apparatus 115 includes the same function and configuration corresponding to the central region detector 500 in FIG. 5, a viewer's central region detector for calculating the central region of the viewer, and the same function and configuration corresponding to the main subject person selector 510 in FIG. 5. The image generating apparatus 115 may further include a viewer's main subject person selector for selecting a representative person (main person of the viewers) from the viewers.

Figure 10:
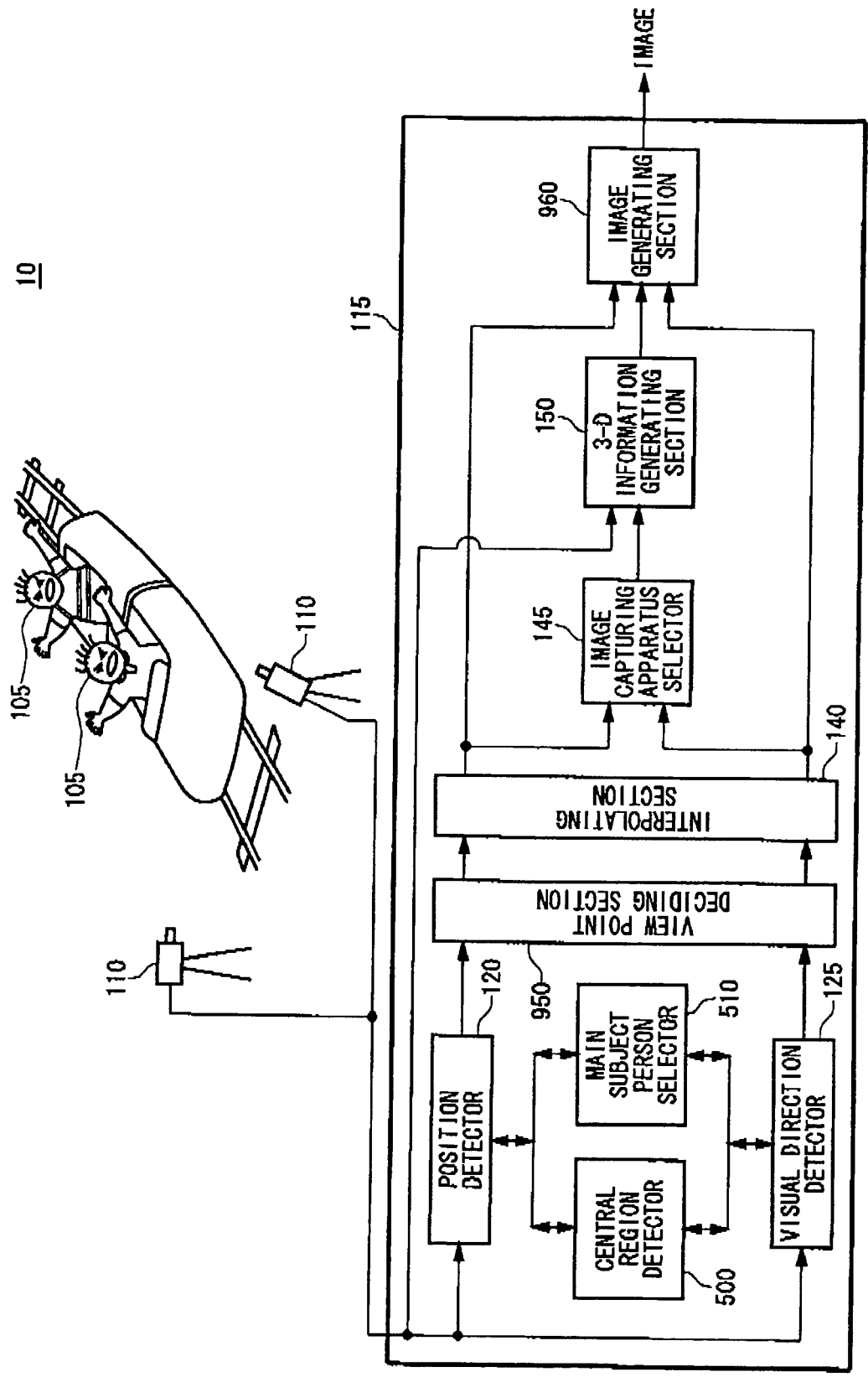
FIG. 10 is a configuration showing the image generating system 10, according to the third modification in the present embodiment.

FIG. 10 is a configuration showing the image generating system 10, according to the third modification in the present embodiment. According to the third modification, it is an object for the image generating system 10 to generate an image of the photographed person 105, who is photographed in at least a part of the plural two-dimensional images, especially an image of the photographed person 105 seen from an anterior view, based on the plural two-dimensional images captured by the plural image capturing apparatuses 110, by photographing the photographed person 105 using the plural image capturing apparatuses 110. According to the image generating system 10 in this modification, the image seen from the anterior view, such as an image in which a photographed person who rides on an attraction machine is photographed at the anterior view, can be obtained, for example, in an amusement park. Components in FIG. 10 bearing the same reference numerals as those in FIGS. 1 and 5 will not be described because they have the same or similar functions as those in FIGS. 1 and 5.

According to the modification, the image generating system 10 includes plural image capturing apparatuses 110 and the image generating apparatus 115. The image generating apparatus 115 includes the position detector 120, the visual direction detector 125, the central region detector 500, the main subject person selector 510, a viewpoint deciding section 950, the interpolation section 140, the image capturing apparatus selector 145, the three-dimensional information generating section 150 and an image generating section 960.

The image generating section 960 decides a viewpoint which is substantially on an extension along the face direction of the photographed person 105, based on both the position of the photographed person 105 detected by the position detector 120 and the face direction of the photographed person 105 detected by the visual direction detector 125. In other words, for example, the viewpoint deciding section 950 decides a viewpoint so that the angle formed by the extension along the face direction of the photographed person 105 and the visual direction of the photographed person 105 becomes within a predetermined angle. The viewpoint deciding section 950 further sets a visual direction seen from the viewpoint to be an opposite direction of the face direction of the photographed person 105.

The image generating section 960 has the substantially similar function and structure to the visual field image generating section 155 in FIG. 1, and generates an image including the photographed person 105, seen from the viewpoint, based on the three-dimensional information and the position of the viewpoint.

Figure 11:
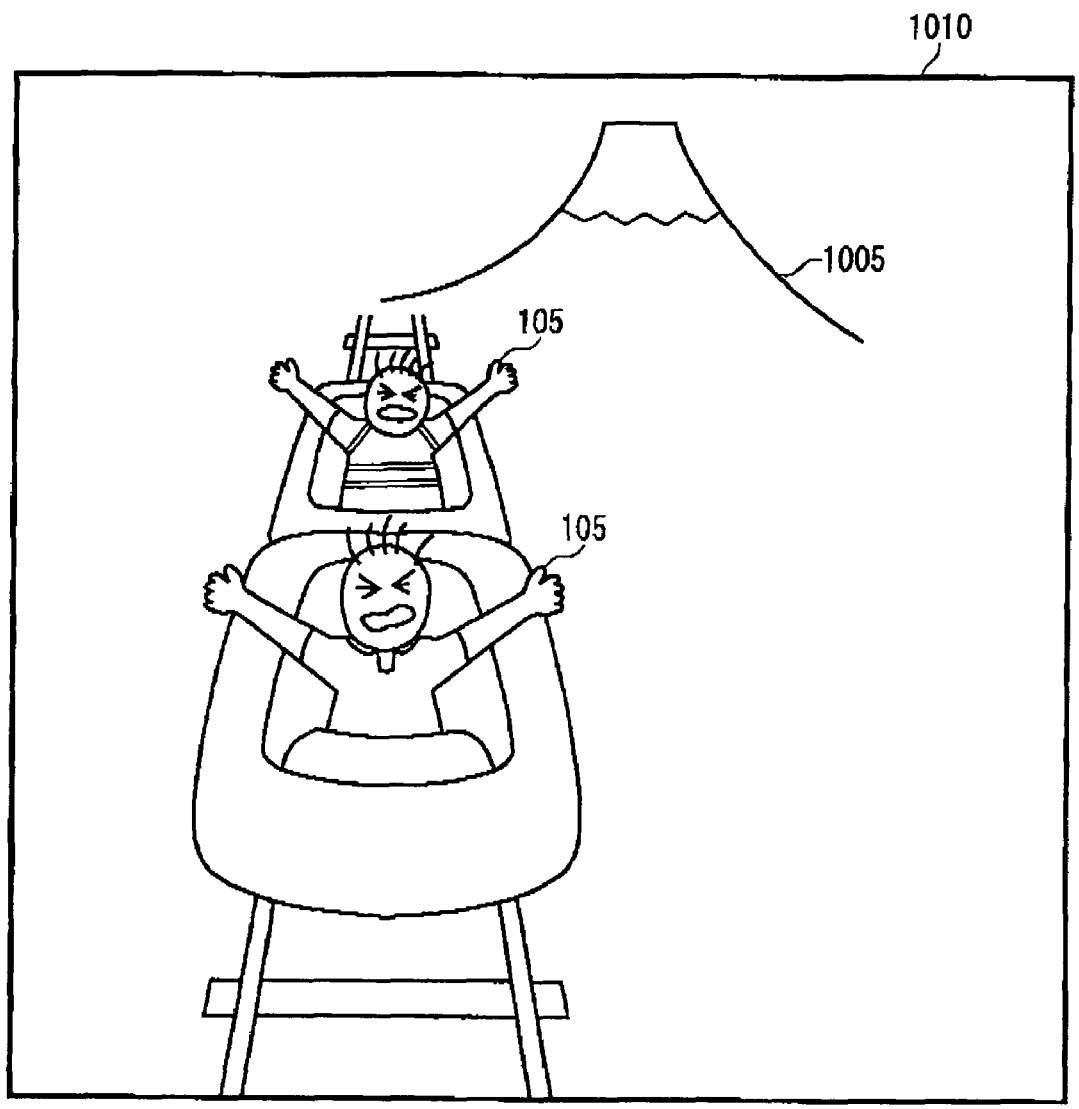
FIG. 11 is an example showing an image 1010 generated by the image generating apparatus 115 according to the third modification of the present embodiment.

FIG. 11 is an example showing an image 1010 generated by the image generating apparatus 115 according to the third modification of the present embodiment The viewpoint deciding section 950 decides a viewpoint which is substantially at the straight front of the photographed person 105, based on both the position of the photographed person 105 detected by the position detector 120 and the face direction of the photographed person 105 detected by the visual direction detector 125. Moreover, the viewpoint deciding section 950 decides a visual line, which extends from the viewpoint to the photographed person 105. Therefore, the image generating section 960 can generate the image 1010 including the photographed person 105, seen from the position of the viewpoint, based on both the three-dimensional information generated by the three-dimensional information generating section 150 and the position of the viewpoint.

Here, the image generating section 960 may generate the image 1010 including both the photographed person 105 seen from the position of the viewpoint and a predetermined subject 1005. More specifically, the image generating section 960 includes the subject 1005 in the generated image 1010 by adjusting the position of the viewpoint, the visual direction and/or the view angle, according to the subject 1005 and the position of the viewpoint or the visual direction which are decided by the viewpoint deciding section 950. Thus, the image generating section 960 can generate the image 1010 of the photographed person 105, including the subject 1005 such as famous scene or a predetermined advertisement, as a background of the image.

Figure 12:
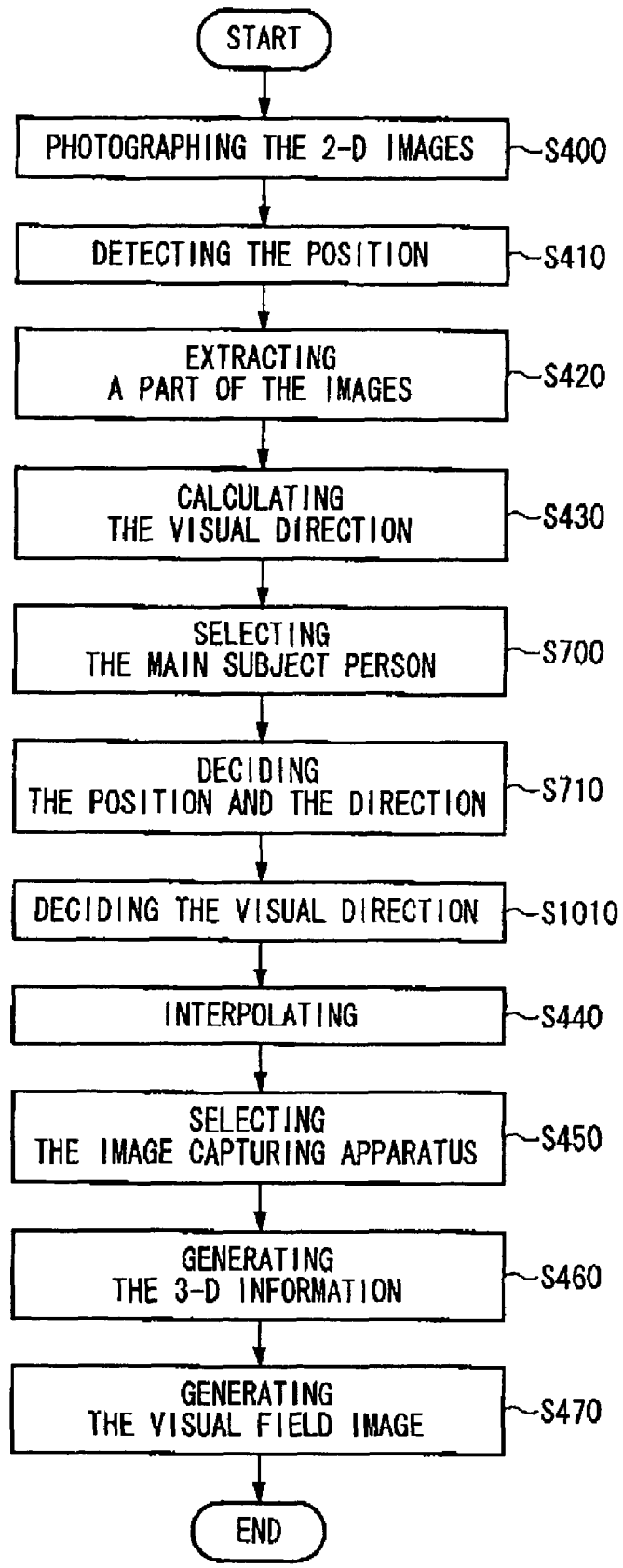
FIG. 12 is a flowchart of the image generating apparatus 115 according to the third modification of the present embodiment.

FIG. 12 is a flowchart of the image generating apparatus 115 according to the third modification of the present embodiment The image generating apparatus 115 processes the steps S400-S430 and the steps S700-S710 in a similar way in FIG. 7, and decides the position and face direction of the photographed person 105. Next, the image generating section 960 decides a viewpoint, which is substantially on an extension along the face direction of the photographed person 105, based on the position and face direction of the photographed person 105 (S1010). Next, the image generating apparatus 115 processes each of the steps S440-S470 regarding the visual line which extends from the observed point to the photographed person 105, in a similar way in FIG. 7, and then generates the image 1010 including the photographed person 105, seen from the viewpoint.

In the steps described above, when plural photographed persons 105 existing, the image generating apparatus 115 decides the visual line of the photographed person 105 according to each of the positions and face directions of the plural photographed persons 105, by the methods explained with reference to FIGS. 6A, 6B and 6C, and then decides the viewpoint of the image 1010 according to this visual line.

More specifically, when using the method in FIG. 6A, the position detector 120 detects each of the positions of the plural photographed persons 105, and calculates the average position by averaging positions of the plural photographed persons 105 (S410). The visual direction detector 125 detects each of the face directions of the plural photographed persons 105, and calculates the average direction by averaging the face directions of the plural photographed persons 105 (S430). Next, the viewpoint deciding section 950 decides the viewpoint, which is on the extension extending from the average position of the plural photographed persons 105 along the average direction of the plural photographed persons 105, based on the average position and average direction of the plural photographed persons 105 (S1010). Consequently, the visual field image generating section 155 generates the image including the plural photographed persons 105, seen from the average position along the average direction (S470).

Alternatively, when using method in FIG. 6B, the central region detector 500 detects the central region so that a density regarding the number of extensions extended from each of a plural photographed persons 105 along each of the face directions of the photographed persons 105, is equal to or more than predetermined density. Next, the main subject person selector 510 selects a photographed person 105 from the plural photographed persons 105 as a main subject person so that the extension extending from the selected photographed person along the face direction of him intersects at the central region (5710) Consequently, the image generating apparatus 115 generates the image including the plural photographed persons 105, seen from the average position along the average direction, based on the three-dimensional information, the average position, and the average direction (S470).

Alternatively, when using method in FIG. 6C, the position detector 120 detects each of the positions of the plural photographed persons 105, and calculates an average position by averaging the positions of the plural photographed persons 105 (S410). Next, the main subject person selector 510 selects a photographed person 105 as the main subject person from the plural photographed persons 105 so that the selected position of the photographed person 105 to be is nearest to the average position. Next, the position detector 120 gives the position of the selected main subject person to the viewpoint deciding section 950 and the visual direction detector 125 gives the face direction of the selected main subject person to the viewpoint deciding section 950 (S710). Next, the viewpoint deciding section 950 decides the viewpoint which is substantially on the extension, extending from the position of the main subject person along the face direction of the main subject person, based on the position and face direction of the main subject person (S1010). Consequently, the image generating section 960 generates the image including the plural photographed persons 105, seen from the position of the viewpoint, based on the three-dimensional information and the position of the viewpoint (S470).

As described above, according to the image generating system 10 in the third modification, it is possible to generate the image of the photographed person 105 seen from an anterior view by detecting the position and face direction of the photographed person 105, using the two-dimensional images of the photographed person 105 photographed by the plural image capturing apparatuses 110.

Figure 13:
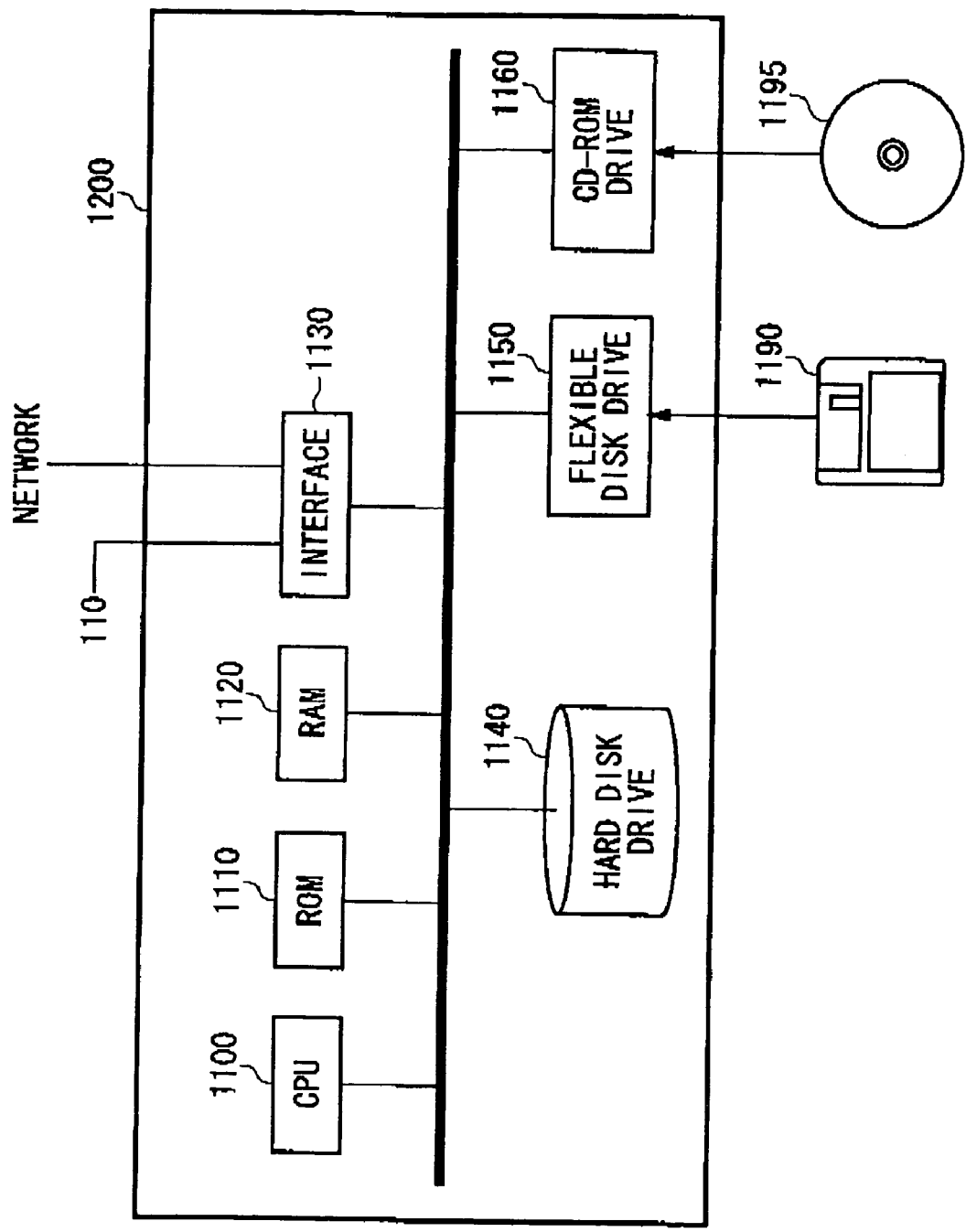
FIG. 13 is a hardware configuration showing a computer 1200 of the present embodiment.

FIG. 13 is a hardware configuration showing a computer 1200 of the present embodiment. The computer 1200 includes a CPU 1100, a ROM 1110, a RAM 1120, a communication interface 1130, a hard disk drive 1140, a flexible disk drive 1150, and a CD-ROM drive 1160.

The CPU 1100 operates based on at least one program stored in the ROM 1110 or RAM 1120 and controls each unit. The ROM 1110 stores a boot program executed by the CPU 1100 during the start-up process of the computer 1200, and programs depending on the hardware of the computer 1200. The RAM 1120 stores programs executed by the computer 1200 and data used by the computer 1200. The communication interface 1130 communicates with other apparatuses through a communication network. The image capturing apparatus 110 is connected to the communication interface 1130 through the communication network. The hard disk drive 1150 stores a program or data, executed by the computer 1200, and provides it to the CPU 1100 via the RAM 1120. The flexible disk drive 1150 reads data or a program from a flexible disk 1190 and provides it to the RAM 1120. The CD-ROM drive 1160 reads data or a program from a CD-ROM 1195 and provides it to the RAM 1120.

The program provided to the CPU 1100 via the RAM 1120 is provided by a user, being stored in a recording medium, for example, the flexible disk 1190, the CD-ROM 1195, and an IC card. The program is read from the recording medium and installed to the computer 1200 via the RAM 1120, and executed in the computer 1200.

The program that is installed to and executed by the computer 1200, and operates the computer 1200 as the image generating apparatus 115, includes a position detecting module, a visual direction detecting module which has a partial image extracting module and a visual direction calculating module, an interpolating module, an image capturing apparatus selecting module, a three-dimensional information generating module, and a visual field image generating module.

The program or each of these modules described above, makes the computer 1200 operate as the position detector 120, the visual direction detector 125 which has the partial image extracting section 130 and the visual direction calculator 135, the interpolation section 140, the image capturing apparatus selector 145, the three-dimensional information generating section 150 and the visual field image generating section 155 respectively.

In addition, the program may include a central region detecting module and a main subject person selecting module. The program or each of the modules make the computer 1200 operate as the central region detector 500 and the main subject person selector 510 respectively.

In addition, the program may include a viewer's position detecting module, a viewer's direction selecting module, a main subject person selecting module, a photographed person's position detecting module, and a photographed person's direction detecting module. The program or each of these modules described above, makes the computer 1200 operate as the viewer's position detector 800, the 805, the 810, the 820, and the photographed person's direction detector 825 respectively In addition, the program may include a viewpoint deciding module and an image generating module. The program or each of these modules described above, makes the computer 1200 operate as the viewpoint deciding section 950 and the image generating section 960 respectively.

The program or the module described above may be stored in an external record medium. It is possible to use an optical record medium such as DVD or PD, a magneto-optical record medium such as Minidisk, a tape medium, a magnetic record medium or a semiconductor memory such as an IC card or a Miniature Card as a record medium instead of the flexible disk 1190 or the CD-ROM 1195. A storage device, such as a hard disk or a RAM in a server system on a dedicated communication network or the Internet, may be used as a record medium, and the program may be provided to the computer 1200 from an external network through the communication network.

Although the present invention has been described by way of exemplary embodiments, it should be understood that those skilled in the art might make many changes and substitutions without departing from the spirit and the scope of the present invention which is defined only by the appended claims.

For example, the position detector 120 and the visual direction detector 125 may provide a more easily viewable visual field image, by fixing the position and the visual direction for a predetermined period, when the photographed person 105 plays a predetermined action, such as an action of shooting a goal. According to this invention, it is possible to generate a visual field image seen from a photographed person, without using the apparatus for detecting the visual direction.

What is claimed is:

1. An image generating apparatus for generating a visual field image seen from a photographed person who is photographed in at least one part of plural two-dimensional images, based on the plural two-dimensional images captured by plural image capturing apparatuses, comprising:
   a photographed person's position detector for detecting a position of the photographed person, based on at least two of the plural two-dimensional images;
   a photographed person's direction detector for detecting a face direction of the photographed person;
   an image capturing apparatus selector for selecting at least two image capturing apparatuses which photograph a visual field of the photographed person, from the plural image capturing apparatuses, based on the position of the photographed person detected by said photographed person's position detector and the face direction of the photographed person detected by said photographed person's direction detector;

a three-dimensional information generating section for generating three-dimensional information of space that is photographed, based on at least two of the two-dimensional images, each captured by a different image capturing apparatus that is selected by said image capturing apparatus selector; and an image generating section for generating the visual field image seen from the position of the photographed person along the face direction, based on the three-dimensional information, the position of the photographed person, and the face direction of the photographed person.

2. The image generating apparatus as claimed in claim 1, wherein said photographed person's direction detector detects a visual direction of the photographed person, as the face direction of the photographed person, and said image generating section generates the visual field image seen from the position of the photographed person along the visual direction, based on the three-dimensional information, the position of the photographed person, and the visual direction of the photographed person.

3. The image generating apparatus as claimed in claim 2, wherein said photographed person's direction detector detects the visual direction based on at least one of the plural two-dimensional images.

4. The image generating apparatus as claimed in claim 2, wherein said photographed person's direction detector includes:

a partial image extracting section for extracting each of partial images corresponding to the photographed person's face and eyes, which are photographed in at least one of the plural two-dimensional images; and a visual direction calculator for calculating the visual direction based on each of the partial images corresponding to the face and eyes, extracted by said partial image extracting section.

5. The image generating apparatus as claimed in claim 2, further comprising:

an image capturing apparatus selector for selecting at least two image capturing apparatuses which photograph a visual field of the photographed person, from the plural image capturing apparatuses, based on the position of the photographed person and the visual direction of the photographed person, wherein said three-dimensional information generating section generates the three-dimensional information, based on the at least two of the two-dimensional images captured by at least said two image capturing apparatuses, which are selected by said image capturing apparatus selector.

6. The image generating apparatus as claimed in claim 5, wherein said image capturing apparatus selector selects at least two image capturing apparatuses, of which relative angle formed by a photographing direction and the visual direction is equal to or less than a predetermined threshold angle, from said plural image capturing apparatuses, based on the position of the photographed person and the visual direction of the photographed person.

7. The image generating apparatus as claimed in claim 2, wherein each of said plural image capturing apparatuses obtain a moving image by photographing the two-dimensional image in each predetermined interval time;

said photographed person's position detector detects each of the positions of the photographed person in each of the time intervals, based on at least two of the plural two-dimensional images, captured in the interval times respectively; and said photographed person's direction detector detects each of the visual directions of the photographed person in each of the interval times, based on at least one of the plural two-dimensional images captured in the interval times respectively; further comprising:

an interpolating section for calculating a position or visual direction of the photographed person in an interval time, based on an another position or an another visual direction in at least an another interval time before or after said time interval, when it is impossible to detect the position or visual direction of the photographed person in said interval time by using the two-dimension image in said time interval, wherein said three-dimensional information generating section generates each of the three-dimensional information in each of the interval times, based on at least two of the plural two-dimensional images captured in the interval times respectively, and said image generating section generates the visual field image based on the three-dimensional information, the position of the photographed person, and the face direction of the photographed person, in each time interval.

8. The image generating apparatus as claimed in claim 1, wherein said photographed person's position detector detects each of the positions of plural photographed persons, based on at least two of the plural two-dimensional images in each of which the plural persons are photographed, and calculates an average position by averaging the positions of the plural photographed persons, said photographed person's direction detector detects each of the face directions of the plural photographed persons, and calculates an average direction by averaging the plural face directions of the plural photographed persons, and said image generating section generates the visual field image seen from the average position along the average direction, based on the three-dimensional information, the average position of the plural photographed persons, and the average direction of the plural photographed persons.

9. The image generating apparatus as claimed in claim 1, further comprising:

a central region detector for detecting a central region so that a density regarding the number of extensions which extend from each of plural photographed persons along each of the face directions of the photographed persons, is equal to or greater than predetermined density; and a main subject person selector for selecting photographed persons from the plural photographed persons as main subject persons so that the extensions which extend from the photographed person along the face directions of the photographed persons intersect at the central region; wherein said photographed person's position detector calculates an average position by averaging the positions of the main subject persons based on at least two of the plural two-dimensional images, said photographed person's direction detector calculates an average direction by averaging the face directions of the main subject persons, and said image generating section generates the visual field image seen from the average position along the average direction, based on the three-dimensional information, the average position, and the average direction.

10. The image generating apparatus as claimed in claim 1, wherein said photographed person's position detector detects each of positions of the plural photographed persons, based on at least two of the plural two-dimensional images and calculates an average position by averaging the positions of the plural photographed persons, further comprising a main subject person selector for selecting a photographed person as a main subject person from the plural photographed persons so that the selected position of the photographed person is nearest to the average position, wherein said photographed person's direction detector detects the face direction of the main subject person, and said image generating section generates the visual field image seen from the position of the main subject person along the face direction of the main subject person, based on the three-dimensional information, the position of the main subject person, and the face direction of the main subject person.

11. The image generating apparatus as claimed in claim 1, further comprising:

a viewer's position detector for detecting a position of a viewer who observes at least one of plural photographed persons in each of the plural two-dimensional images;

a viewer's direction detector for detecting a face direction of the viewer;

a main subject person selector for identifying the photographed person the viewer is observing as a main subject person, based on the position of the viewer and the face direction of the viewer;

wherein said photographed person's position detector detects a position of the main subject person, based on at least two of the plural two-dimensional images, said photographed person's direction detector detects a face direction of the main subject person, and said image generating section generates the visual field image seen from the position of the main subject person along the face direction of the main subject person, based on the three-dimensional information, the position of the main subject person, and the face direction of the main subject person.

12. The image generating apparatus as claimed in claim 11, wherein said viewer's position detector detects the position of the viewer, based on at least two of the plural two-dimensional images, and said viewer's direction detector detects the face direction of the viewer based on at least one of the plural two-dimensional images.

13. The image generating apparatus as claimed in claim 11, wherein said viewer's position detector detects each of the positions of the viewers, and calculates an average position by averaging the positions of the plural viewers, said viewer's direction detector detects each of the face directions of the viewers, and calculates an average direction by averaging the face directions of the plural viewers, and said main subject person selector identifies the photographed person the plural viewers are observing as a main subject person, based on the average position of the plural viewers and the average direction of the plural viewers.

14. The image generating apparatus as claimed in claim 1, wherein said image generating section generates the visual field image including a predetermined subject, which the visual field image is seen from the position of the photographed person along the face direction, based on the three-dimensional information, the position of the photographed person, and the face direction of the photographed person.

15. An image generating method for generating a visual field image by a computer, which the image is seen from a photographed person who is photographed in at least one part of the plural two-dimensional images, based on plural two-dimensional images captured by plural image capturing apparatuses, comprising:

a photographed person's position detecting step for detecting a position of the photographed person based on at least two images of the plural two-dimensional images, by the computer;

a photographed person's direction detecting step for detecting a face direction of the photographed person, by the computer;

an image capturing apparatus selecting step for selecting at least two image capturing apparatuses which photograph a visual field of the photographed person, from the plural image capturing apparatuses, based on the position of the photographed person detected by said photographed person's position detector and the face direction of the photographed person detected by said photographed person's direction detector, by the computer;

a three-dimensional information generating step for generating three-dimensional information of space that is photographed, based on at least two of the two-dimensional images, each captured by a different image capturing apparatus that is selected by said image capturing apparatus selector, by the computer; and an image generating step for generating the visual field image seen from the position of the photographed person along the face direction of the photographed person, based on the three-dimensional information, the position of the photographed person, and the face direction, by the computer.

16. A computer readable medium storing thereon a program for generating a visual field image by a computer, which the image is seen from a photographed person who is photographed in at least one part of the plural two-dimensional images, based on plural two-dimensional images captured by plural image capturing apparatuses, the program comprising:

a photographed person's position detecting module for detecting a position of the photographed person, by the computer;

a photographed person's visual direction detecting module for detecting a face direction of the photographed person, by the computer;

an image capturing apparatus selecting module for selecting at least two image capturing apparatuses which photograph a visual field of the photographed person, from the plural image capturing apparatuses, based on the position of the photographed person detected by said photographed person's detector and the face direction of the photographed person by said photographed person's direction detector, by the computer;

a three-dimensional information generating module for generating three-dimensional information of space that is photographed, based on at least two of the two-dimensional images, each captured by a different image capturing apparatus that is selected by said image capturing apparatus selector, by the computer; and an image generating module for generating the visual field image seen from the position of the photographed person along the face direction, based on the three-dimensional information, the position of the photographed person, and the face direction of the photographed person.

* * * * *